United States Patent [19]

Ivanov et al.

[11] 4,267,496
[45] May 12, 1981

[54] DEVICE FOR DAMPING OSCILLATIONS

[76] Inventors: Gely M. Ivanov, ulitsa 3 Tverskaya-Yamskaya, 42/8, kv. 45, Moscow; Vladislav I. Novikov, ulitsa Kosmonavtov, 44, kv. 18; Vladimir V. Khmelev, 1 Pankovsky proezd, 21, kv. 24, both of Ljubertsy Moskovskoi oblasti, all of U.S.S.R.

[21] Appl. No.: 40,434

[22] Filed: May 18, 1979

[51] Int. Cl.$^3$ .......................... G05B 5/01; G05B 6/02
[52] U.S. Cl. ..................................... 318/615; 318/621
[58] Field of Search ............... 318/615, 616, 617, 621; 188/1 B; 73/133 R, 118

[56] References Cited

U.S. PATENT DOCUMENTS

| | | | |
|---|---|---|---|
| 3,493,826 | 2/1970 | Wandrey | 318/617 |
| 3,887,853 | 6/1975 | Klein et al. | 318/307 X |

FOREIGN PATENT DOCUMENTS 2250224  10/1974  France .

Primary Examiner—James J. Gill
Attorney, Agent, or Firm—Holman & Stern

[57] ABSTRACT

This invention relates to devices for damping oscillations in electromechanical and automatic control systems comprising actuators, various drives and flexible members providing mechanical coupling between the actuators and drive motors.

In the general case the hereinproposed device furnishes a corrective signal being in phase opposition with respect to the a-c component of the signal taken from a moment or force transducer. This signal is applied to the input of the controlled drive, thereby damping mechanical oscillations. The device, according to the invention, may comprise several channels, each channel having such series-connected components as a fundamental-frequency sine-wave signal generation unit, a differentiating unit, a net time lag tuning unit, and an amplitude tuning unit. The number of channels corresponds to the number of discriminated fundamental frequencies, the input of each channel being connected to a signal frequency separation unit coupled to the moment or force transducer, while the output of each channel is connected to the input of a unit adding up signals of all channels, said signal adder unit being connected to the input of the controlled drive.

14 Claims, 17 Drawing Figures

DEVICE FOR DAMPING OSCILLATIONS

This invention relates to devices for damping oscillations in electromechanical and automatic control systems comprising actuators, various controlled drives and flexible members providing mechanical coupling between the actuators and drive motors.

The aforesaid systems may, for example, include such actuators as mill rolls, section rolls of paper-making machines, a shovel boom, a d-c or an a-c machine serving as a generator in mechanical transmission test stands and the like.

An electric drive incorporating an appropriate control system, a hydraulic drive, a heat engine and like components may act as a controlled drive. A beam or bar possessing a limited rigidity, a shaft or transmission, e.g. of a helicopter, a flexible coupling, a spring, a cable, a rope and like parts may be used as a flexible member.

Various mechanical oscillations are set up under the action of disturbing forces within systems, the mechanical drives of which comprise flexible members and have clearances. This may upset the rated operating conditions of the installation and result in premature wear of parts and assebies of units or impair the production quality. Such oscillations may occur in metal-cutting machines, mechanical transmission test stands, paper-making machines, excavators and like installations.

Known in the art are systems wherein suitable mechanical means are employed to damp the occurring oscillations. Such means generally comprise dampers and dynamic suppressors. The dampers are designed to additionally absorb the energy produced due to forces of dry, viscous or internal friction. The dynamic suppressors effecting no damping are designed as an additional mechanical system whose mass is small as compared to the mass of the main system. The self-resonant frequency of the additional system is chosen to be equal to the frequency of the disturbing force acting on the main system.

Most common are dynamic suppressors that effect damping and are designed as a flexible coupling member or a resistance dynamic suppressor. High-polymer materials such, for example, as rubber are normally used as flexible damping elements in the aforesaid suppressors. The distinguishing features of such suppressors are a greater dispersion of energy and a wider damped oscillation frequency range.

However, nonlinear flexibility characteristics of materials, specific interrelation of their properties and varying characteristics for dyanamic and static loading are factors complicating the process of designing suitable suppresssors. So, the design and manufacture of suppressors for different mechanisms entail intricate procedures suited to a particular case.

A limitation substantially increasing the production cost is that it is practically impossible to standardize the construction of such dynamic suppressors. Furthermore, the operation of the suppressors presents a serious difficulty considering their low reliability and intricate construction.

The known mechanical means for damping oscillations in electromechanical systems are effective only under predetermined operating conditions and their dimensions depend on the parameters of the main system, which generally limits the application of such means. This prevents the use of the aforesaid means in mechanisms having large inertial masses.

The prototype of the present invention is the known device for damping oscillations in a system comprising an electric drive and a flexible coupling load (cf. accepted French application No. 2,250,224 filed Oct. 25, 1974).

The aforesaid device for damping oscillations is used in a system comprising a motor coupled to a load through a flexible member and operated from a thyristor converter. A signal is fed to the input of a current regulator from a speed governor accepting at its input a speed-setting signal and a negative feedback signal from a tachometer generator. The current regulator also accepts at its input a negative feedback signal picked off from a current generator and an elasticity moment 1st order derivative negative feedback signal determined roughly as a difference between the motor and actuator speeds, the two signals being applied simultaneously.

Although it has become possible in the aforesaid system to reduce to an extent elasticity moment variations and to compensate partly for the effect of elasticity of the mechanical parts by aligning the current regulator with elasticity moment derivative negative feedback applied to its input, the speed of operation and accuracy of such a system are substantially lower as compared to the herein proposed system. This is due to the fact that the application of elasticity moment 1st order derivative negative feedback corresponds to the use of an additional corrective signal having a predetermined phase dependent upon the characteristic of an actual differentiating member, the signal phase being not always optimum as regards the damping of mechanical oscillations.

Derivatives of higher order are frequently used in automatic control systems. If, for example, an elasticity moment 2nd order derivative is introduced into a particular system through an actual differentiating member, the resultant corrective signal will be shifted in phase by less than 180 electrical degrees with respect to the signal picked off from a moment transducer. Introducing an elasticity moment 3rd order derivative yields a phase shift exceeding 180 electrical degrees after passage through actual differentiating members. So, the introduction of the 2nd and 3rd order derivatives does not allow generation of a corrective signal having an optimum phase with respect to the a-c component of the signal proportional to the elasticity moment.

Also known in the art are methods of damping oscillations by the use of a sum of derivatives enabling generation of a corrective signal being in phase opposition with respect to system oscillations. This is accomplished, however, by obtaining the sum of elasticity moment derivatives having appropriate expansion coefficients:

$$U_{cor}=K_1 dM/dt + K_2 d^2M/dt^2 + \ldots K_n d^n M/dt^n$$

Such methods are rather complicated even in dealing with simple models and present considerable difficulties in designing and adjusting actual electromechanical systems. It is clear that the selection of a great number of coefficients for respective derivatives is difficult in using the known methods.

A primary object of the present invention is to provide for adequate damping of oscillations in various systems.

Another object of the invention is to increase the speed of operation of systems.

A still another object of the invention is to enhance the accuracy of automatic control and servo systems.

A further object of the invention is to improve the stability of automatic control systems.

A still further object of the invention is to simultaneously increase the control accuracy, speed of operation and stability of systems.

A specific object of the invention is to enhance operational reliability of systems.

An additional object of the invention is to improve the performance of units.

Another additional object of the invention is to improve the production quality of electromechanical systems.

Another specific object of the invention, as applicable to a helicopter transmission test system, is to substantially reduce dynamic loads on transmission under test.

A still another specific object of the invention, as applicable to a helicopter transmission test system, is to create conditions enabling the use of d-c machines connected in a manner providing for a maximum economic effect and interrelated so that a motor drives a load generator through transmission under test due to which the generator produces electrical energy and supplies it to the motor.

A further specific object of the invention, as applicable to a helicopter transmission test system, is to ensure stable operation of synchronous electric machines connected in a manner allowing interrelation therebetween, which makes it possible to establish helicopter transmission test systems rated at high speed and power.

A still further specific object of the invention, as applicable to a continuous mill rolling control system, is to simultaneously increase the speed of operation and operational reliability of a mill roll and reduce dynamic loads.

One more specific object of the invention, as applicable to a helicopter primary mechanical structure test system, is to permit the execution of a complete testing program including the application of ultimate loads so high as to break the transmission elements, and performance of repeated tests during which it is possible to obtain accurate data regardless of weather conditions, as well as to provide for a reduced liquid fuel consumption, a lower noise level, and a lesser amount of exhaust gases discharged into the surrounding atmosphere.

The foregoing and other objects of the invention are attained by that a device for damping oscillations in a system including a controlled drive and an actuator mechanically interconnected through a flexible member having a moment or force transducer, according to the invention, comprises a corrective assembly employing a network of such series-connected elements as a differentiating unit, a net time lag tuning unit and an amplitude tuning unit connected to the moment or force transducer and to the controlled drive and furnishing to the input of said drive a signal being in phase opposition with respect to the a-c component of a signal unambiguously characterizing mechanical oscillations within the system.

The hereinproposed device makes it possible to increase the speed of operation and reliability of corresponding systems by reducing dynamic loads.

It is of advantage with nonharmonic mechanical oscillations occurring in the system wherein high-frequency oscillations are superimposed on fundamental-frequency oscillations to additionally introduce into the corrective unit a fundamental-frequency sine-wave signal generation unit placed in series between the moment of force transducer and the differentiating unit in which case the network (channel) made up of such series-connected elements as the fundamental-frequency sine-wave signal generation unit, differentiating unit, net time lag tuning unit and the amplitude tuning unit furnishes a signal fed to the input of the controlled drive and damping the oscillations.

Provision of the additional fundamental-frequency sine-wave signal generation unit makes it possible to obtain 1st, 2nd and even 3rd order derivatives in the differentiating unit.

If nonharmonic oscillations having several fundamental frequencies in their spectrum occur within the system, a multichannel corrective unit may be provided, the number of channels thereof corresponding to the number of frequency-discriminated main signals and the input of each channel being connected to a signal frequency separation unit coupled to the moment or force transducer, while the output of each channel is connected to the input of a unit adding up signals of all channels, the output of the signal adder unit being connected to the drive input.

Oscillations occurring at the most dangerous frequencies may thus be damped.

The corrective assembly may include a corrective signal frequency control unit placed in series between the amplitude tuning unit and the input of the controlled drive.

The herein proposed device is, therefore, also suitable for use with systems having nonlinear elements.

The corrective assembly may additionally incorporate a phase-sensitive rectifier placed in series between the amplitude tuning unit and the input of the controlled drive.

So, a lower tuning accuracy is required in the herein-proposed device for damping oscillations.

The device forming the subject of the present invention may include a primary element accomplishing the damping of oscillations within the system, said element being rigidly coupled to the movable part of the actuator and electrically connected to the output of the corrective assembly.

The oscillations within the system are thus damped more effectively.

It is of advantage to incorporate in each branch an individual corrective assembly connected to the moment or force transducer and to the input of the controlled drive if the system includes an extensive multimember kinematic chain made up of several branches, each branch having a controlled drive and an actuator mechanically interconnected through a flexible member provided with a moment or force transducer, while the actuators are mechanically interconnected, for example, through the material being processed or handled. The oscillations are thus damped within each branch of the system.

A device for damping oscillations in a helicopter transmission test system comprising:

a controlled drive including a regulated voltage source and a d-c motor electrically connected thereto with such series-connected components as a speed governor of said motor and a current regulator of said regulated voltage source, said current regulator being connected to said voltage source;

an actuator including a d-c generator and an exciter, electrically connected to said motor and producing a loading moment in the helicopter transmission, and such series-connected components as a loading moment regulator, a current regulator and a generator exciting current regulator, said exciting current regulator being connected to the exciter;

a flexible member including the helicopter transmission under test with a moment transducer mounted thereon, which interconnects mechanically the shafts of the motor and generator;

according to the invention, may incorporate a corrective assembly connected to the output of the loading moment regulator, electrically coupled to the inputs of the generator exciting current regulator and the current regulator of the regulated voltage source and furnishing a signal which is in phase opposition with respect to a signal corresponding to the a-c component of the moment transmitted by the helicopter transmission.

The use of the herein proposed device for damping oscillations makes it possible to reduce dynamic loads in the transmission and connect d-c machines in helicopter transmission test systems in a manner providing for a maximum economic effect.

A device for damping oscillations in a helicopter transmission test system comprising:

a controlled drive including a regulated voltage source and a d-c motor electrically connected thereto with a current generator, an angular speed transducer and such series-connected components as a speed governor and current regulator of said motor, the inputs of said governor and said regulator being connected to the current generator and speed transducer, while the output of the current regulator is connected to said voltage source;

a flexible member including the helicopter transmission under test with a moment transducer mounted thereon, according to the invention, may incorporate:

a synchronous motor rigidly coupled to the d-c motor;

an actuator including a synchronous generator mechanically coupled to said synchronous motor through the transmission under test, electrically connected to said synchronous motor and producing a loading moment in said transmission, the control system of said synchronous generator containing such series-connected components as a loading moment regulator, a stator current regulator and an exciting current regulator of said synchronous machines, the field windings of which are series-connected and whose circuit is coupled to the output of the first exciter, the machine exciting current regulator being connected to the exciter input, while the outputs of the exciting current generator, synchronous machine stator current generator and the loading moment transducer are coupled to the inputs of the respective regulators, the second input of a programming device being coupled to the input of the moment regulator through an integrator;

a second exciter electrically connected to the field winding of the d-c motor;

a corrective assembly connected to the moment transducer and coupled via its output to the inputs of the synchronous machine exciting current regulator and the d-c motor current regulator.

The adoption of the herein proposed device for damping oscillations permits utilization of synchronous machines having greater power and rotation speed limits as compared to d-c machines, this advantage being due to the fact that stable operation of synchronous machines is ensured within the entire load variation range in transmission test systems.

A device for damping oscillations in a system controlling continuous mill rolls comprising:

a controlled drive including a regulated voltage source, a d-c motor and an exciter connected thereto and such series-connected components as an integrator, a speed governor and a motor current regulator, the current regulator being connected to said regulated voltage source, and also such series-connected components as a motor e.m.f. regulator and a motor exciting current regulator, the exciting current regulator being connected to said exciter;

an actuator including mill rolls;

a flexible member including a shaft with a reduction gear and a moment transducer mounted on said shaft, according to the invention, may incorporate a corrective assembly connected to the moment transducer, coupled at the same time to the inputs of the motor current regulator and the motor exciting current regulator and furnishing a signal which is in phase opposition with respect to the a-c component of the moment transmitted by the shaft;

a controller.

The herein proposed device for damping oscillations may additionally incorporate a primary element such as a d-c machine with an exciter, a current regulator and an exciting current regulator, the armature of which is electrically connected to the armature of said motor and whose shaft is rigidly coupled to the mill rolls; a signal frequency separation unit connected to the output of the moment transducer; several corrective channels (assemblies) whose inputs are connected to the output of said signal frequency separation unit; and a unit adding up signals of all channels, the input of which is connected to the outputs of all channels and whose output is connected at the same time to the d-c machine current regulator, motor current regulator and the motor exciting current regulator.

The use of the herein proposed device for damping oscillations makes it possible to increase the speed of operation and reliability of the system by reducing dynamic loads.

A device for damping oscillations in an extensive multimember helicopter transmission test system comprising:

a multiconnection helicopter transmission including the following flexible members, a first input shaft with a free-wheeling clutch mounted thereon, a second input shaft with a free-wheeling clutch mounted thereon, a shaft with steering rotor reduction gears and a main rotor shaft mechanically interconnected through a main reduction gear, each shaft having a moment transducer, according to the invention, may incorporate; a controlled drive of the first input shaft comprising a first induction motor electrically connected to the output of a first d-c/a-c converter providing regulated frequency current, a first controlled rectifier, the input of which is connected to a supply mains and whose output is coupled to the input of said first converter, a motor angular speed control system made up of such series-connected components as a speed governor and a current regulator, the inputs of which are coupled to the current generator of said controlled rectifier and to the speed transducer of said motor, the current regulator being connected to the input of said first controlled rectifier;

a controlled drive of the second input shaft including a second induction motor electrically connected to the output of a second d-c/a-c converter providing regulated frequency current, a second controlled rectifier, the input of which is connected to the supply mains and whose output is coupled to the input of the second converter, and a motor angular speed control system made up of such series-connected components as a speed governor and a current regulator, the inputs of which are coupled to the second controlled rectifier current generator and the second motor speed transducer, the current regulator being connected to the input of the second controlled rectifier;

an actuator including a first synchronous generator with an exciter, controlled to the supply mains through a third rectifier and an inverter, mechanically coupled to the steering rotor shaft and producing a loading moment on said shaft, a loading moment control system made up of such series-connected components as a moment regulator and an exciting current regulator of said generator and also of a moment transducer and an exciting current generator of said generator connected to said regulators, the output of the exciting current regulator being coupled to said exciter of said synchronous generator, as well as a second synchronous generator with its exciter mechanically coupled to the main rotor shaft and producing a loading moment on said shaft and a loading moment control system made up of such series-connected components as a moment regulator and a second generator exciting current regulator and also of a moment transducer and an exciting current generator connected to said regulators, the output of the exciting current regulator being coupled to the exciter of the second generator;

two parallel circuits, each of which includes a rectifier and a transformer, the inputs of said circuits being connected to the stator windings of the second synchronous generator, whereas the outputs thereof are connected to the output of the first and second controlled rectifiers;

a corrective assembly connected to the output of the moment transducer mounted on the first input shaft, said corrective assembly being electrically coupled to the controlled rectifier current regulator;

a corrective assembly connected to the output of the moment transducer mounted on the second input shaft, said corrective assembly being electrically coupled to the second controlled rectifier current regulator;

a corrective assembly connected to the output of the moment transducer mounted on the steering rotor shaft, said corrective assembly being electrically coupled to the first synchronous generator exciting current regulator;

a corrective assembly connected to the output of the moment transducer mounted on the main rotor shaft, said corrective assembly being electrically coupled to the second synchronous generator exciting current regulator.

The herein proposed device makes possible the use of a system for testing the entire primary mechanical structure of a helicopter, wherein a complete testing program may be carried out, including the application of ultimate loads so high as to break the transmission elements, the apparent advantages being the possibility of obtaining repeated test data regardless of weather conditions, a reduced fuel consumption, a lower noise level and a lesser amount of exhaust gases discharged into the surrounding atmosphere.

The invention will now be described further with reference to specific embodiments thereof, taken in conjunction with the accompanying drawings, wherein.

Figures 11, 13:
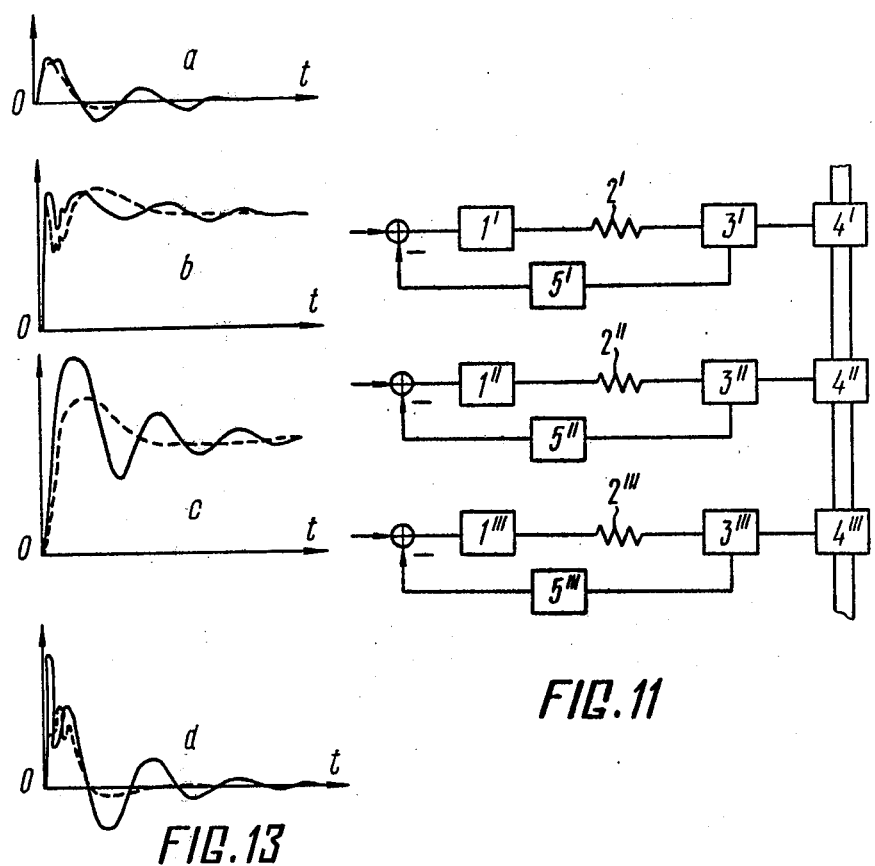
FIG. 11 is a block diagram of the device for damping oscillations in a system with an extensive multimember kinematic chain according to the invention.
Figure 14:
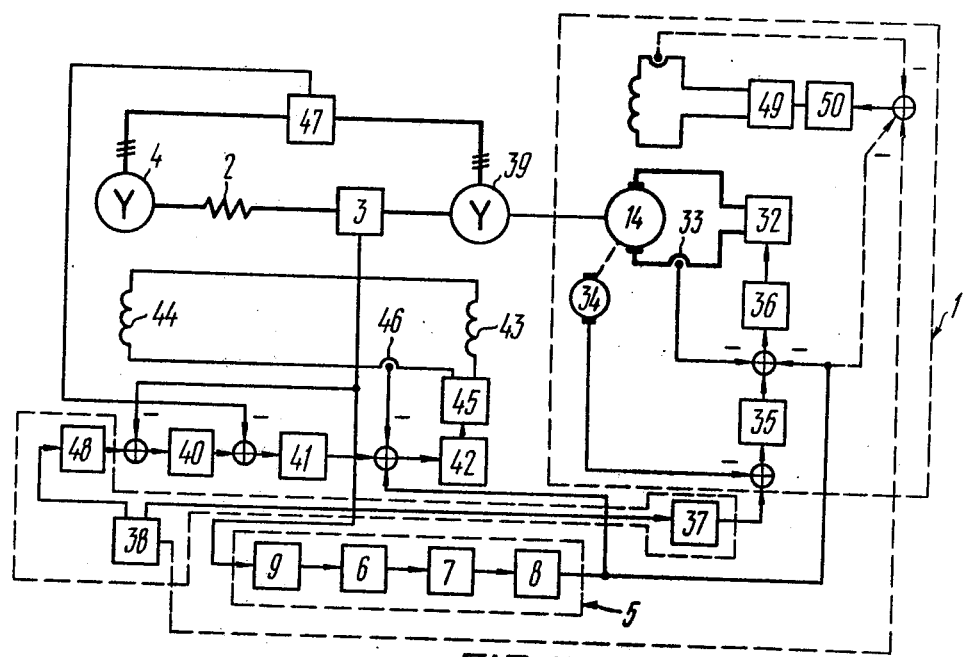
Figure 15:
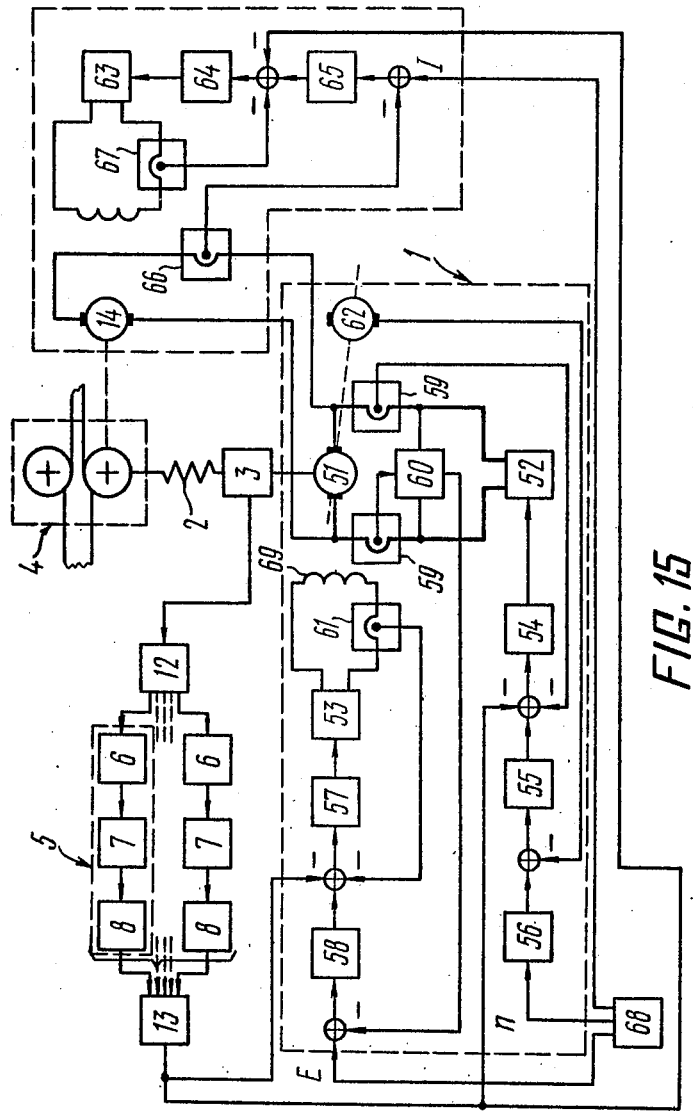
Figure 16:
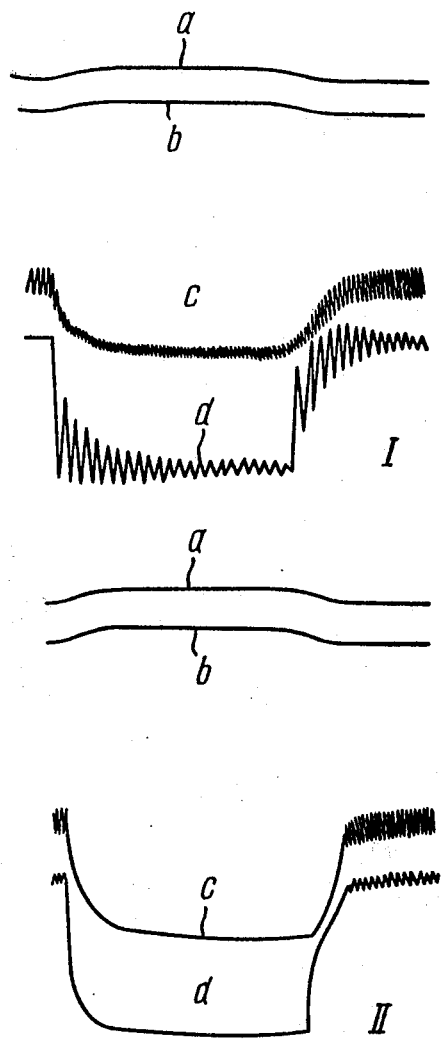
Figure 17:
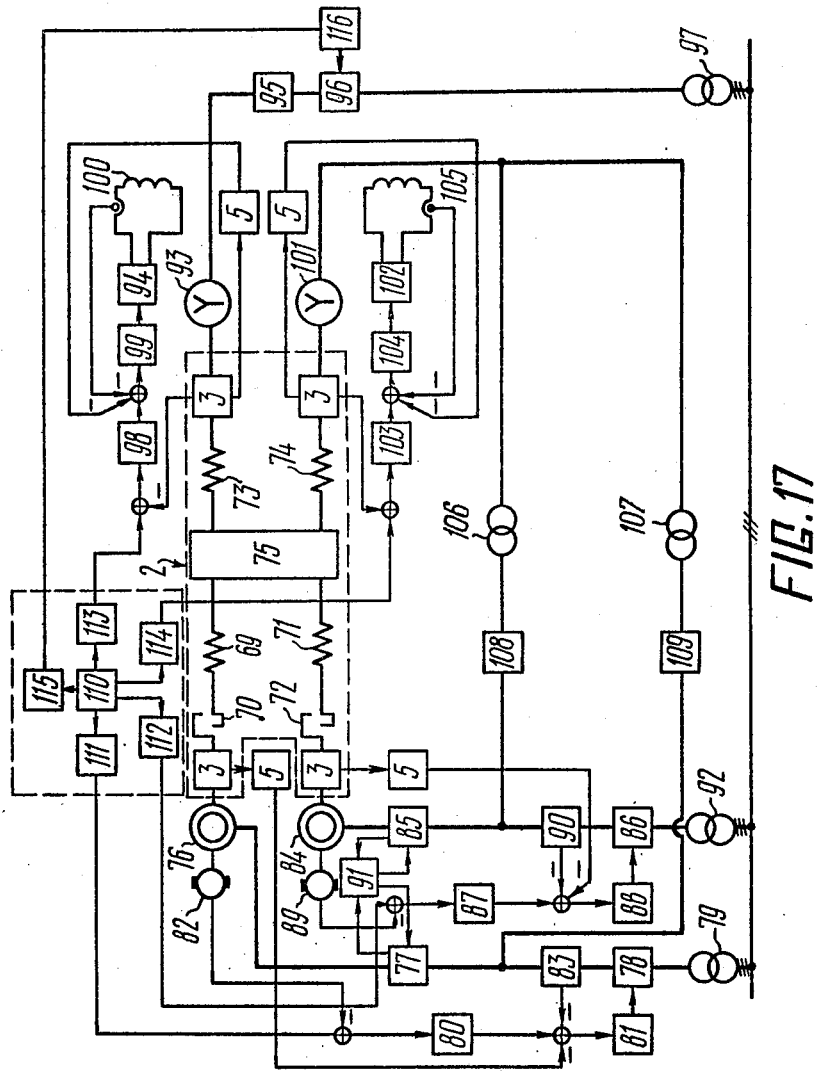

FIG. 13 shows transient curves in the helicopter transmission test system with motor speed being varied in steps. In the drawing solid lines indicate that the system is used without the device for damping oscillations, while dashed lines indicate that the system is used with such a device. The letters in the drawing denote the following: a—moment variation curves for a flexible member; b—motor speed variation curves; c—generator speed variation curves; d—generator current variation curves;

FIG. 14 is a block diagram of still another specific embodiment of the device for damping oscillations as applicable to a helicopter transmission test system according to the invention;

FIG. 15 is a block diagram of a third embodiment of the device for damping oscillations as applicable to a system controlling mill rolls according to the present invention;

FIG. 16 shows transient curves in a system controlling mill rolls 4 with loading moment being varied in steps. Curves I indicate that the system is used without the device for damping oscillations, while curves II indicate that the system is used with such a device. The letters in the drawing denote the following: a—curves showing speed variation of rolls 4; b—curves showing speed variation of motor 51; c—curves showing current variation of motor 51; d—curves showing moment variation in flexible member 2; and FIG. 17 is a block diagram of a fourth embodiment of the device for damping oscillations as applicable to an extensive multimember helicopter transmission test system according to the invention.

As stated above, the presence of flexible members and clearances in mechanical transmissions results, under the action of disturbing forces, in the appearance of mechanical oscillations that increase dynamic loads applied to the parts and assemblies of units thereby, causing their damage. Any reduction of dynamic loads in units having flexible members and clearances results in a lower accuracy and speed of operation of systems effecting automatic control of various current electromechanical parameters, which degrades the efficiency and impairs the production quality. Such units include rolling mills, paper-making machines, metal-cutting machines, drilling rigs, excavators, coal combines, ball mills, forge-and-press machines and like equipment.

So, for example, over 50% of failures of mechanical parts in rolling mills and of electrical machine parts are due to fatigue stresses caused by peak loads associated with elastic mechanical oscillations.

In modern high-speed paper-making machines and production lines, for example, an increase in the accuracy of systems controlling the speed of sectional power drives results in the appearance of sustained oscillations and damage to mechanical transmissions.

The development of effective power-operated stands for testing mechanical transmissions with flexible members is also hindered by the fact that the speed and load may not be always varied according to desired laws due to the appearance of mechanical oscillations and unstable operation of electrical machines.

One of the urgent problems at the present time is, therefore, the development of electrical devices for damping oscillations in electromechanical systems since such devices are much more versatile as compared to similar mechanical devices.

Figure 1:
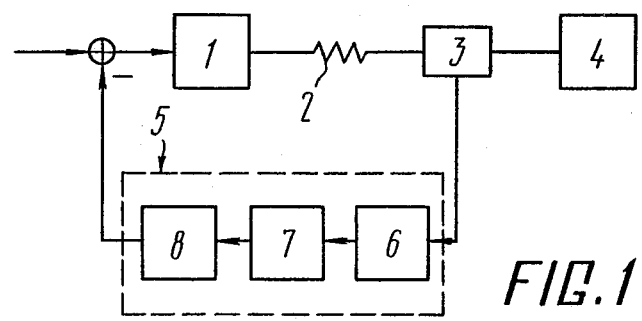
FIG. 1 is a master block diagram of a device for damping oscillations according to the invention.

A system wherein oscillations occur generally comprises a controlled drive 1 (FIG. 1) of any suitable type such, for example, as a power drive, a hydraulic drive and the like, the movable portion of which is mechanically coupled to the movable portion of an actuator 4 through a flexible member 2 with a moment or force transducer 3. The device for damping oscillations in the given system comprises a corrective assembly 5, the input of which is connected to the moment or force transducer 3 and whose output is connected to the input of the drive 1, the corrective assembly 5 being made up of such three series-connected components as a differentiating unit 6, a net time lag tuning unit 7, and an amplitude tuning unit 8. The moment or force transducer 3 performs either direct or indirect moment or force measurements.

The differentiating unit 6 develops at its output a lead signal which is in the general case proportional to the sum of moment or force derivatives of the 1st to the n-th order. In a specific case the differentiating unit may develop at its output a signal proportional only to one moment or force derivative of a certain order. The differentiating unit 6 may, for example, incorporate operational amplifiers, the negative feedback circuits of which contain integrating sections (not shown in FIG. 1). The net time lag tuning unit 7 displaces in time the signal coming from the differentiating unit without distorting its waveform. The net time lag tuning unit 7 may, for example, incorporate operational amplifiers which expand a net lag function into the Padet series (cf. L. Levin "Methods of Solving Technical Problems Using Analog Computers", "Mir" publishers, Moscow 1966, pp. 141–143).

The amplitude tuning unit 8 serves to align the corrective signal amplitude with the amplitude of the input signal setting the current parameter of the drive 1. The amplitude tuning unit 8 may incorporate a conventional operational amplifier, the negative feedback circuit of which contains a variable resistor.

In the general case the corrective assembly 5 develops at its output a signal which is in phase opposition with respect to the a-c component of the signal picked off from the moment or force transducer 3.

As mechanical oscillations occur in the aforesaid system, the signal taken from the moment transducer 3 is fed through the corrective assembly 5 to the input of the controlled drive 1, thereby damping moment oscillations in the mechanical part of the system. Information on moment or force oscillations in the system is conveyed from the transducer 3 to the input of the drive 1 with an appropriate lead by the use of the differentiating unit 6 which develops at its output a signal proportional either to the sum of moment or force derivatives of the 1st to the n-th order or to one derivative of a certain order (say, 2nd other derivative). The net time lag turning unit 7 delays the corrective signal until it is in phase opposition with respect to the signal picked off from the moment transducer 3. A more accurate tuning is accomplished with due account for the amplitude-frequency characteristics of the drive 1 and the moment transducer 3.

Figure 2:
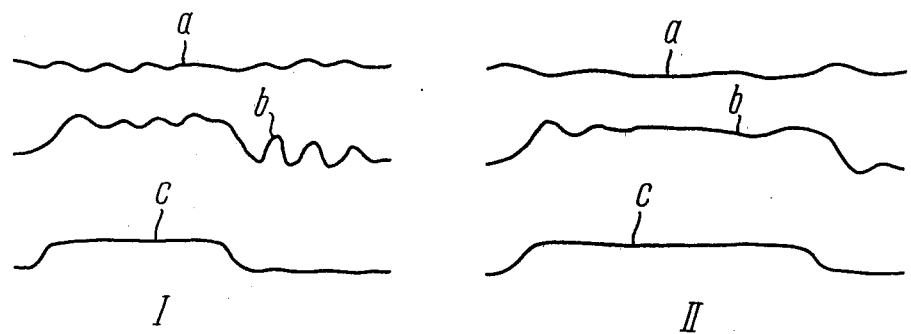
FIG. 2 shows transient curves for a drive 1 with loading moment being varied in steps without the use of the device for damping oscillations (curves I) and with the use of such a device (curves II). The letters in the drawing denote the following: a—motor speed variation curve; b—moment variation curve for a flexible member; c—loading moment variation curve.

Referring to FIG. 2 it is seen that the motor speed (a) and the moment (b) in the flexible member vary within great limits (curves I) in the case of using a power drive having flexible members in its mechanical part with loading moment (c) being varied in steps. These variations are appreciably reduced (curves II) by introducing into the system the corrective assembly 5 comprising the network made up of such series-connected components as the differentiating unit 6, net time lag tuning unit 7 and the amplitude tuning unit 8 connected to the moment or force transducer 3 and to the input of the controlled drive 1.

Figure 3:
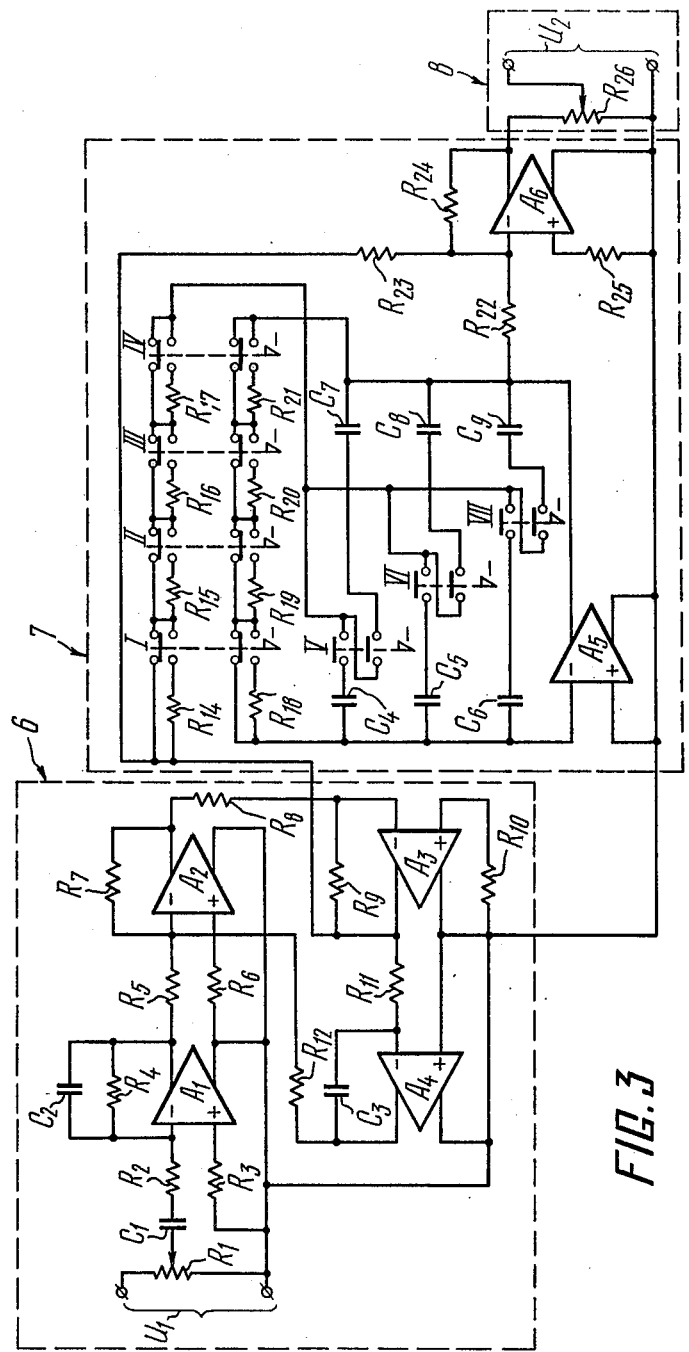
FIG. 3 is a circuit diagram of a specific embodiment of a corrective assembly according to the invention.

FIG. 3 is a circuit diagram of a specific embodiment of the corrective assembly 5 designed to shape a corrective signal.

The corrective assembly 5 includes such series-connected components as the 2nd order differentiating unit 6, net time lag tuning unit 7, and the amplitude tuning unit 8.

The 2nd order differentiating unit 6 includes a 1st derivative discriminating circuit employing an operational amplifier $A_1$ and a series-connected 2nd derivative discrimanating circuit employing amplifiers $A_2$, $A_3$, and $A_4$. The first circuit is based on a well-known low-pass differentiator (cf. V. L. Shilo "Linear Integrated Circuits", Moscow, 1974, "Soviet Radio") comprising such series-connected components as a differentiating section and two integrating sections. An input signal $U_1$ is fed to a potentiometer $R_1$. The potentiometer slide is connected to the inverting input of the operational amplifier $A_1$ through a capacitor $C_1$ and a series-connected resistor $R_2$. The inverting input of the amplifier $A_1$ is also coupled to such parallel-connected components as a capacitor $C_2$ and a feedback resistor $R_4$ of the amplifier $A_1$. The second outputs of the capacitor $C_2$ and resistor $R_4$ are connected to the output of the amplifier $A_1$. The noninverting input of the operational amplifier $A_1$ is connected to a common circuit conductor through a resistor $R_3$.

The time constant of the differentiating portion of the bandpass differentiator is $T_1=R_4 \cdot C_1$; a corresponding portion of the differentiator amplitude-frequency response has a rate of rise equal to about $+20$ dB/decade in the preferred embodiment of the invention. The time constants of the integrating portion of the bandpass differentiator are $T_2=R_2 \cdot C_1$ and $T_3=R_4 \cdot C_2$; a corresponding portion of the amplitude-frequency response has a decay rate of about 20 dB/decade.

The 2nd derivative discriminating circuit represents a widely known implicit differentiation circuit (cf. "Analog Computer Simulation Basics" edited by A. I. Kulakovsky, Moscow, 1971, "Mashinostroenye") employing three operational amplifiers $A_2$, $A_3$, and $A_4$. The output of the amplifier $A_1$ is connected to the inverting input of the amplifier $A_2$ through a resistor $R_5$. Also connected to the inverting input of the amplifier $A_2$ are a feedback resistor $R_7$ of the operational amplifier $A_2$ and a resistor $R_{12}$ coupling it to the output of the amplifier $A_4$. The output of the amplifier $A_2$ is connected to the feedback resistor $R_7$ and a resistor $R_8$ coupled to the inverting input of the amplifier inverter $A_3$. A feedback resistor $R_9$ connects the output of the amplifier inverter $A_3$ with its inverting input. The noninverting inputs of the amplifiers $A_2$ and $A_3$ are connected to a common circuit conductor via respective resistors $R_6$ and $R_{10}$. The output of the amplifier inverter $A_3$ is connected to the inverting input of the integrating amplifier $A_4$ through a resistor $R_{11}$ and also to the input of the net time lag tuning unit 7. The output and inverting input of the amplifier inverter $A_4$ are interconnected by means of an inverting capacitor $C_3$. The noninverting input of the amplifier inverter $A_4$ and also the common leads of the amplifiers $A_1$, $A_2$, $A_3$, $A_4$, $A_5$, and $A_6$ are connected with the common circuit conductor.

The differentiating time constant of the second differentiator is $T_4=R_{11} \cdot C_3$; the gain of the differentiator proportional section is $K_1=R_7/R_5$; its amplitude-frequency response having a rate of rise equal to about $+20$ dB/decade.

The net time lag tuning unit 7 employs the amplifiers $A_5$ and $A_6$. The known circuit of the unit permits approximate expansion of a function $e^{-p\tau}$ into the 2nd order Padet series (cf. V. N. Zhovinsky "Voltage Memory Circuits and Delay Units", Moscow-Leningrad, 1963, "Gosenergoizdat").

The input signal of the net time lag tuning unit 7 comes from the output of the amplifier inverter $A_3$ simultaneously to certain leads of resistors $R_{14}$, $R_{23}$ and the first lead of the first pair of normally closed contacts of a button I of the net time lag tuning unit 7.

Resistors $R_{14}$, $R_{15}$, $R_{16}$, $R_{17}$ and resistors $R_{18}$, $R_{19}$, $R_{20}$, $R_{21}$ are simultaneously switched by means of independent buttons I to IV. The weights of said switched resistors are proportional in pairs, for example to a discrete code 8-4-2-1. Feedback capacitors $C_4$, $C_5$, $C_6$ and $C_7$, $C_8$, $C_9$ are switched in a similar way by means of buttons V to VII, the weights of said capacitors being proportional in pairs to a code 4-2-1. The use of the aforementioned switched resistors and capacitors in the feedback circuit of the amplifier $A_5$ allows discrete setting of the net time lag in the unit 7.

The other lead of the bank of the switched resistors $R_{14}$, $R_{15}$, $R_{16}$, $R_{17}$ is connected to the common contacts of the buttons V to VII. Connected to the other leads of said buttons are respective leads of the switched capacitors $C_4$, $C_5$, $C_6$ and $C_7$, $C_8$, $C_9$. The second leads of the capacitors $C_4$, $C_5$, $C_6$ are connected to the inverting input of the amplifier $A_5$, while the second leads of the capacitors $C_7$, $C_8$, $C_9$ are connected to the output of the amplifier $A_5$ whose noninverting input is coupled to the common circuit conductor.

The output of the amplifier $A_5$ is coupled via a resistor $R_{22}$ to the inverting input of the amplifier $A_6$, which is also connected to the other lead of a resistor $R_{23}$ and feedback resistor $R_{24}$ of the amplifier $A_5$. The noninverting input of the amplifier $A_6$ is connected to the common circuit conductor through a resistor $R_{25}$.

When the ratio between the values of the two banks of the switched resistors $R_{14}+R_{15}+R_{16}+R_{17}$ and $R_{18}+R_{19}+R_{20}+R_{21}$ is 12:5 and the ratio between the values of the two banks of the switched capacitors $C_4+C_5+C_6$ and $C_7+C_8+C_9$ is 5:1 with $R_{22}=R_{23}=R_{24}$, the net time lag of the unit 7 will be:

$$\tau=(R_{18}+R_{19}+R_{20}+R_{21})(C_4+C_5+C_6)$$

Connected to the output of the amplifier $A_6$ is the feedback resistor $R_{24}$ and one lead of a potentiometer $R_{26}$ of the output signal amplitude tuning unit 8. The other lead of the potentiometer $R_{26}$ is connected to the common circuit conductor.

An output voltage $U_2$ of the corrective assembly is taken from the moving contact of the potentiometer $R_{26}$ and the common circuit conductor.

Figure 4:
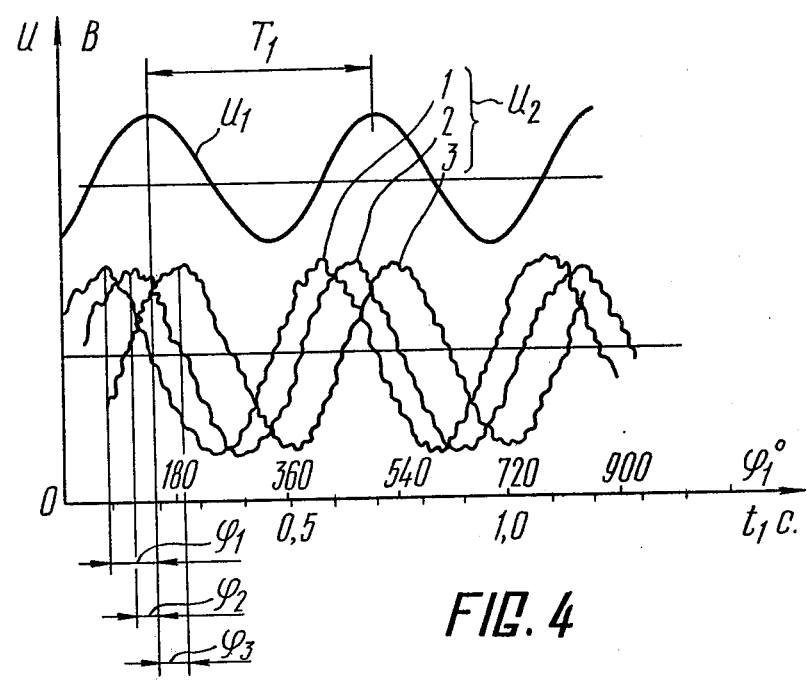
FIG. 4 illustrates operation of the corrective assembly by reference to waveforms representative of variation of a shift angle between input and output voltages according to the invention.

FIG. 4 shows waveforms of input ($U_1$) and output ($U_2$) signals in a specific embodiment of the corrective assembly 5. Curves 1 and 2 of the output signal $U_2$ have a phase lead $\phi_1=+72°$ and $\phi_2=+36°$ respectively and curve 3 has a phase lag $\phi_3=-54°$ with respect to the phase of the input signal $U_1$ at a preset frequency of 2 Hz ($T_1=500$ ms) in the preferred embodiment of the corrective assembly 5.

Figure 5:
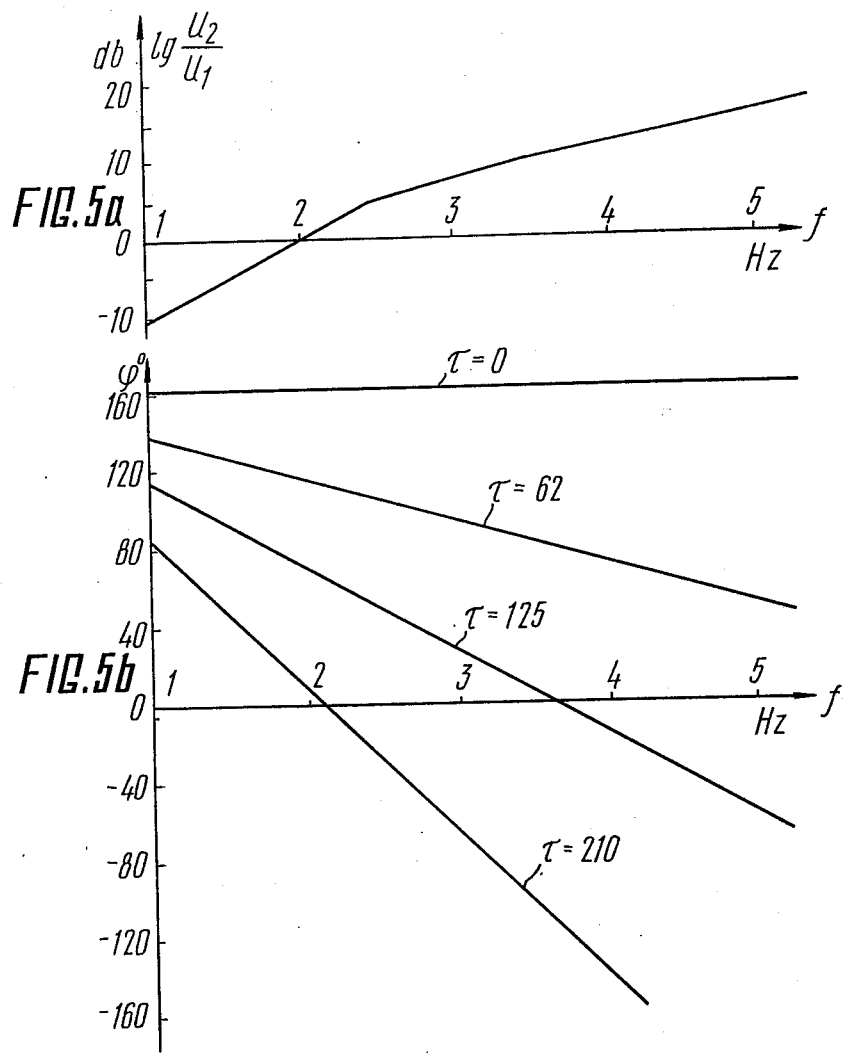
FIG. 5 shows amplitude-frequency (a) and phase-frequency (b) curves for the corrective assembly according to the present invention.

FIG. 5 shows an amplitude-frequency curve (a) and a set of phase-frequency curves (b) for the corrective assembly 5, plotted at preset values of the net time lag of the unit 7.

The specifications of the corrective assembly shown in FIG. 2 are as follows:
input signal ($U_1$) frequency range ... 1 to 4 Hz
maximum phase lead of signal $U_2$ with respect to signal $U_1$ ... $+160°$
phase control range for net time lag tuning unit at a frequency of 2 Hz ... 0° to 150°
level of input ($U_1$) and output ($U_2$) signals ... 8 V It should be stressed again that the particular circuitry, description and specifications relate just to one of the many possible embodiments of the corrective assembly 5.

If no moment transducer 3 is provided in the system, the input of the differentiating unit 6 of the corrective assembly 5 may be connected to the motor current generator 3. The output terminals of the corrective assembly 5 are connected in the same way as in the case of using the moment transducer 3.

In the case of nonharmonic mechanical oscillations with high frequency oscillations superimposed on fundamental-frequency oscillations, which occur, for example, in the presence of clearances or additional elements having small masses, it is of advantage to include a fundamental-frequency sine-wave generation unit 9 (FIG. 6) in the corrective assembly 5 placing it in series with the differentiating unit 6, net time lag tuning unit 7, and the amplitude tuning unit 8.

The unit 9 may comprise an active lowpass filter at the output of the moment transducer 3 in a specific case, for example in the presence of a noise signal.

Figure 7:
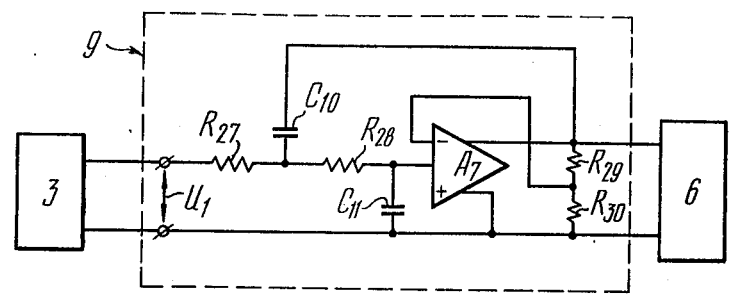
FIG. 7 is a circuit diagram of a specific embodiment of a sine-wave signal generation unit 9 employing an active lowpass filter.

In this case, in order to discriminate the fundamental harmonic of the occurring oscillations and suppress the noise signal, the signal $U_1$ of the moment transducer 3 is first applied to the input of the active lowpass filter 9 and then from the output of said filter to the input of the differentiating unit 6 (FIG. 7).

In a specific case the lowpass filter may employ an operational amplifier $A_7$, the input of which is connected to resistors $R_{27}$, $R_{28}$ and a capacitor $C_{11}$ and whose output is connected to resistors $R_{29}$ and $R_{30}$. A capacitor $C_{10}$ is placed in the feedback circuit of said amplifier. The common lead of said amplifier is connected to the common circuit conductor. The cutoff frequency of the lowpass filter is chosen so as to provide minimum variation of the fundamental harmonic phase and, on the other hand, maximum attenuation of the noise signal.

Figure 6:
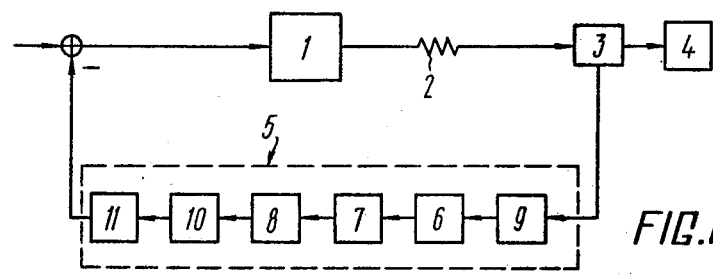
FIG. 6 is a block diagram of one embodiment of the device for damping oscillations, comprising a fundamental-frequency sine-wave signal generation unit, a corrective signal frequency control unit and a phase-sensitive rectifier according to the invention.

In the case of nonlinear electromechanical systems the corrective assembly 5 may include a corrective signal frequency control unit 10 and a phase sensitive rectifier 11 which makes it possible to separate a voltage half-wave of desired polarity from the a-c component of the corrective signal (FIG. 6). In a specific case the unit 10 may employ a smoothing filter and the unit 11 may use a diode.

Figure 8:
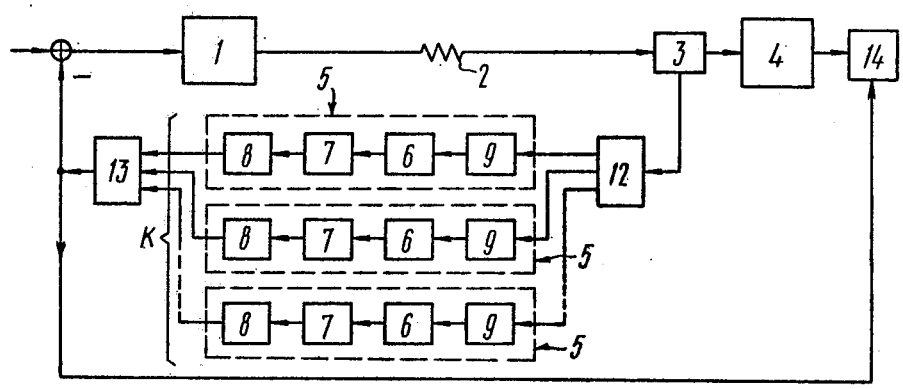
FIG. 8 is a block diagram of another embodiment of the device for damping oscillations with separate channels and an additional primary element, a signal frequency separation unit and a signal adder unit according to the invention.

The corrective assembly 5 is preferably provided for each frequency in the case of mechanical oscillations having several fundamental frequencies and occurring, for example, concurrently or separately as a result of system speed variation or under the action of disturbing forces. The device for damping oscillations should then additionally comprise a signal frequency separation unit 12 connected to the moment or force transducer 3 (FIG. 8).

The output of the unit 12 is connected to parallel channels, each channel comprising the respective corrective assembly 5. The corrective assembly 5 of each channel includes the fundamental-frequency sine-wave signal generation unit 9, differentiating unit 6, net time lag tuning unit 7, and the amplitude tuning unit 8. The outputs of the amplitude tuning units 8 of all channels are connected to the inputs of the units 13 adding up signals of all channels (FIG. 8). The unit 13 may, for example, comprise an operational amplifier. The output of the unit 13 is connected both to the input of the drive 1 and to the input of a primary element 14.

It is of advantage to include the primary element 14 in case the amplitude-frequency response of the drive precludes passage of a corrective signal through its system acting as a filter. The effectiveness of the device for damping oscillations is then increased by the use of the primary element 14 rigidly coupled to the movable part of the actuator 4. An electromagnetic clutch, a fluid clutch, a d-c machine, an a-c machine or a like component may be used as a primary element.

As mechanical oscillations occur in the system, the composite signal taken from the moment or force transducer 3 is applied to the input of the signal frequency separation unit 12 from whose output the signal of each fundamental frequency is fed to the channels comprising the corrective assemblies 5, the signal in each channel being successively passed through the sine-wave signal generation unit 9, differentiating unit 6, net time lag tuning unit 7, and the amplitude tuning unit 8. The signals taken from the outputs of the units 8 are fed to the input of the unit 13 adding up signals of all channels. Thereupon the signals are transmitted from the output of the adder unit to the inputs of the drive 1 and the primary element 14, thereby damping the oscillations.

The signal frequency separation unit 12 may include a set of bandpass filters, each filter being tuned to a predetermined signal frequency.

Figure 9:
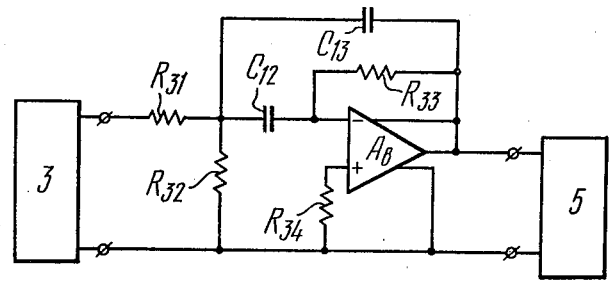
FIG. 9 is a circuit diagram of a bandpass filter.

FIG. 9 is a circuit diagram of a well-known bandpass filter employing an operational amplifier $A_8$ having resistors $R_{31}$, $R_{32}$ and a capacitor 12 connected at its input. The feedback circuits of said amplifier contain a resistor $R_{33}$ and a capacitor $C_{13}$. The common lead of the amplifier $A_8$ is connected to the common circuit conductor. The noninverting input of the amplifier $A_8$ is connected to the common circuit conductor through a resistor $R_{34}$.

The operating principle of such a filter circuit is well known (cf. V. L. Shilo "Linear Integrated Circuits", Moscow, 1974, "Soviet Radio"). The lower separation frequency of the signal spectrum is determined by the differentiating portion, while the integrated portion of the bandpass filter determines the upper separation frequency. To enable a better separation of adjacent frequencies within the oscillation spectrum, the bandpass filter assembly may comprise several series-connected filters of the same type.

Figure 10:
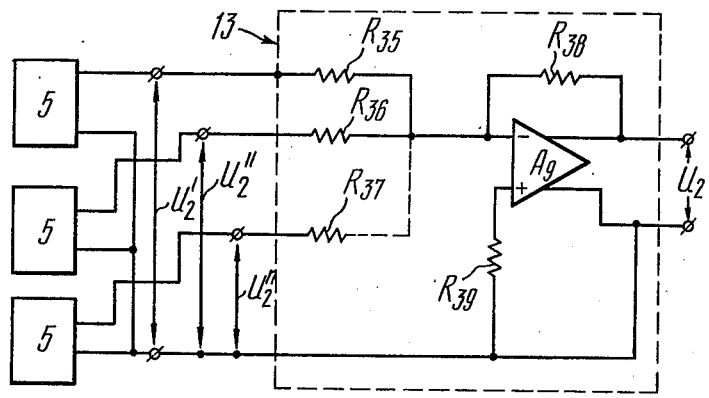
FIG. 10 is a circuit diagram of a simple embodiment of the signal adder unit.

FIG. 10 shows one embodiment of the unit 13 adding up signals of all channels, which employs an operational amplifier $A_9$. Signals $U_2^I$, $U_2^{II}$, ... $U_2^n$ of the channels are fed to the unit 13 through resistors $R_{35}$, $R_{36}$, and $R_{37}$.

A resistor $R_{38}$ is placed in the negative feedback circuit of the amplifier $A_9$. The noninverting input of said amplifier is connected to the common circuit conductor through a resistor $R_{39}$. The common lead of the amplifier is connected to the common circuit conductor.

In a complex system having an extensive multimember kinematic chain and actuators (FIG. 11) mechanically interconnected, for example, through a material (2) being handled or processed, it is of advantage to connect the input of the corrective assembly 5 to the moment transducer 3 mounted on each shaft and the output thereof to the input of the controlled drive 1 of the same shaft.

Figure 12:
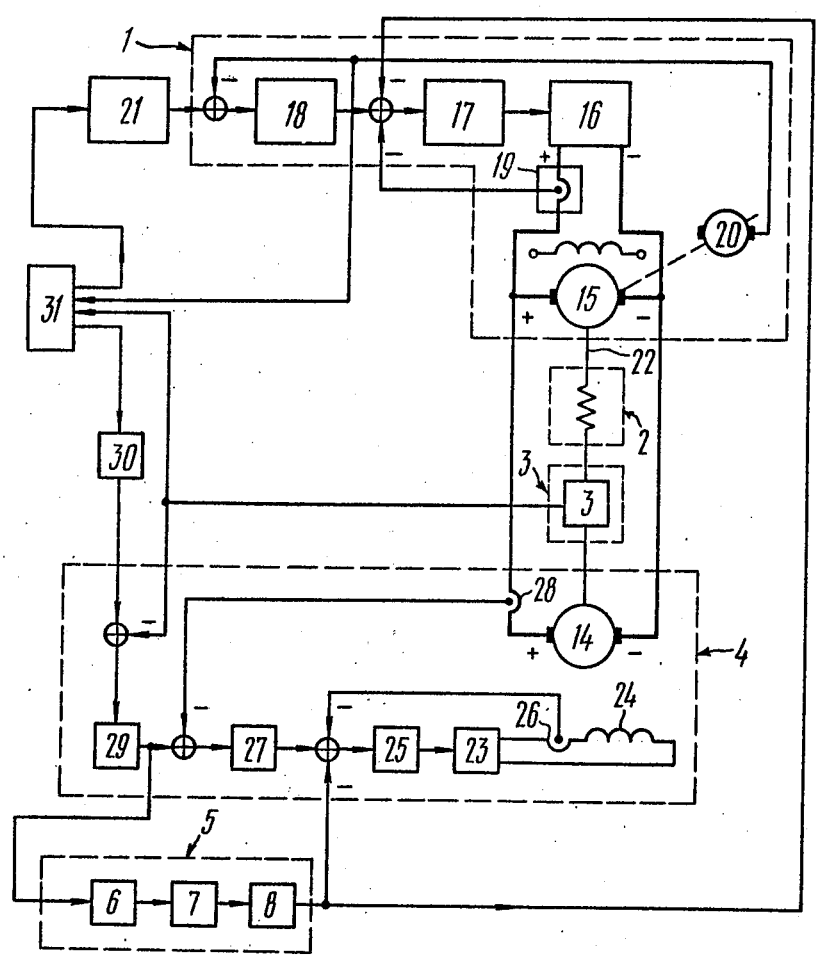
FIG. 12 is a block diagram of a specific embodiment of the device for damping oscillations as applicable to a helicopter transmission heat system according to the invention.

FIG. 12 shows a specific embodiment of the device for damping oscillations in a helicopter transmission test system according to the invention.

The controlled drive 1 includes a d-c motor 15, a regulator voltage source 16, for example a thyristor converter, and a speed control system with a current regulator 17, a speed governor 18, a current generator 19, a speed transducer 20, and an integrator 21. The regulator and governor may, for example, employ operational amplifiers. The flexible member 2 includes a helicopter transmission 22 with the moment transducer arranged thereon. The actuator 4 includes a generator 14 with an exciter 23, for example a thyristor converter, and a loading moment control system. The generator 14 serves to produce a loading moment in the transmission 22 by varying current across its field winding 24. In the preferred embodiment of the invention the generator 14 also acts as an additional primary element. The loading moment control system incorporates an exciting current regulator 25 with an exciting current generator 26, a current regulator 27 with a current generator 28, a moment regulator 29, and an integrator 30.

A programming device 31 is used to control operation of the helicopter transmission test system. The shaft of the motor 15 is mechanically coupled to the shaft of the generator 14 through the helicopter transmission 22. Besides, the armatures of the generator 14 and the motor 15 are electrically interconnected and coupled to the regulated voltage source 16. The converter 16 may be replaced by a generator.

The corrective assembly 5 employs such series-connected components as the differentiating unit 6, net time lag tuning unit 7, and the amplitude tuning unit 8.

The elements comprised in the systems controlling the speed of the motor 15 and the loading moment of the generator 14 are connected as follows.

One input of the programming device 31 is connected to the input of the speed governor 18 of the motor 15 through the integrator 21.

The output of the speed transducer 20 of the motor 15 is electrically coupled to the inputs of the speed governor 18 and the programming device 31. The output of the speed governor 18 is connected to the input of the current regulator 17 of the converter 16. The output of the current generator 19 of the converter 16 is connected to the input of the current regulator 17. The output of the current regulator 17 is connected to the input of the converter 16 whose output is connected to the armature of the motor 15.

The other output of the programming device 31 is connected to the input of the moment regulator 29 through the integrator 30. The output of the moment transducer 3 is connected to the input of the programming device 31 and to the input of the moment regulator 29. The output of the current regulator 27 of the generator 14 is connected to the outputs of the moment regulator 29 and the current generator 28 of the generator 14.

The input of the exciting current regulator 25 of the generator 14 is connected to the outputs of the current regulator 27 of the generator 14 and the exciting current generator 26 of the generator 14. The output of the exciting current regulator 25 of the generator 14 is connected to the exciter 23 whose output is connected to the field winding 24 of the generator 14. The input of the corrective assembly 5 made up of such series-connected components as the differentiating unit 6, net time lag tuning unit 7 and the amplitude tuning unit 8 is connected to the output of the loading moment regulator 29, while the output of the corrective assembly 5 is connected to the input of the exciting current regulator 25 of the generator 14 and to the input of the current regulator 17 of the converter 16.

The helicopter transmission test system is controlled by the programming device 31 in two stages: at the first stage the motor 15 picks up the preset speed in the absence of a loading moment and at the second stage the transmission is loaded with the aid of the generator 14.

At both stages the systems controlling the speed of the motor 15 and the loading moment produced by the generator 14 are operative. At the first stage a signal corresponding to the preset speed of transmission rotation is fed from the programming device 31 to the input of the integrator 21, the control signal across the input of the integrator 30 being zero whereby the e.m.f. of the generator 14 will be automatically maintained at a level providing for the absence of current flow in a common circuit of the armatures of the generator 14 and the motor 15.

As soon as the transmission 22 rotates at the preset speed, the programming device 31 furnishes a signal enabling control of the transmission loading moment in accordance with the chosen program. When this is done, the exciting current of the generator 14 increases to allow current from the generator 14 to pass through the armature of the motor 15. The larger the exciting current of the generator 14 the greater is the loading moment in the transmission 16. Special control systems are utilized to stabilize the speed of rotation of the motor 15 and the load of the generator 14. The generator 14 will be run as a motor and the motor 15 as a generator when the torque sign in the transmission under test is to be changed.

As mechanical oscillations occur in the system, for example, when the speed of transmission rotation or the loading moment changes abruptly, the signal indicative of elasticity moment variations in the transmission is fed through the moment transducer 3 to the input of the moment regulator 29 and then from the output of the moment regulator 29 to the input of the corrective assembly 5.

The differentiating unit 6 develops at its output a lead signal proportional, for example, to the 3rd order derivative of the output signal of the loading moment regulator 29. On passing through the net time lag tuning unit 7, the signal is shifted in phase with respect to the signal of the elasticity moment transducer 3 so that its value is optimum for damping mechanical oscillations. The desired amplitude of the corrective signal is set by the amplitude tuning unit 8.

The signal generated in the corrective assembly 5 is simultaneously applied to the inputs of the exciting current regulator 25 of the generator 14 and the current regulator 17 of the converter 16, thereby damping the oscillations. The effectiveness in using the corrective assembly 5 and connecting its input and output to the system is ensured by the fact that, unlike the case when the system utilizes signals proportional to the elasticity moment derivative of a certain order and having a predetermined phase, the phase of the signal in the case of employing the corrective assembly 5 may be varied in respect to the signal picked off from the moment transducer 3 within wide limits, the phase being constant for a particular system and optimum as regards maximum damping of mechanical oscillations.

In the case of nonharmonic oscillations the corrective assembly 5 may additionally include the fundamental-frequency sine-wave signal generation unit 9 placed in series between the moment transducer 3 and the network made up of the differentiating unit 6, net time lag tuning unit 7 and the amplitude tuning unit 8.

If the spectrum of nonharmonic oscillations occurring in the system contains several fundamental frequencies, the corrective assembly employs several channels, the number of which corresponds to the number of discriminated frequencies, each channel comprising the fundamental-frequency sine-wave signal generation unit 9, differenitating unit 6, net time lag tuning 7 and the amplitude tuning unit 8, the input of each channel being connected to the output of the signal frequency separation unit 12 coupled to the moment transducer 3, while the output of each channel is connected to the input of the unit 13 adding up signals of all channels.

In the case of nonlinear systems the corrective assembly 5 may, if necessary, additionally comprise the corrective signal frequency control unit 10 and the phase-sensitive rectifier 11.

As seen from FIG. 13 fluctuations in moment (a), motor speed (b), speed (c) and current (d) of the generator (solid lines) occur in the helicopter transmission test system with the motor speed being varied in steps. When the system used the corrective assembly 5 connected to the output of the loading moment regulator 29 and electrically coupled to the inputs of the exciting current regulator 25 of the generator 14 and the current regulator 17 of the regulated voltage source 16, the fluctuations will decay faster (dashed lines), i.e., the speed of operation of the system will be substantially increased.

The aforesaid helicopter transmission test system is effective considering the fact that power drawn from the supply mains is spent only on mechanical and electrical losses. Without the use of the corrective assembly 5 such a system may not, however, provide for testing conditions corresponding to actual dynamic loads occurring while the helicopter takes off, lands or makes a turn since owing to great inertial masses of the motor 15 and the generator 14 mechanical oscillations occurring in the system and having abruptly increasing peak moments are likely to cause damage to the transmission. The use of the corrective assembly 5 and its connection to the output of the moment regulator 29 and to the outputs of the exciting current regulator 25 and the current regulator 17 of the motor provide for intensive damping of mechanical oscillations and permit testing of the transmission 22 under all helicopter flight conditions.

FIG. 14 shows another embodiment of the device for damping oscillations as applicable to a helicopter transmission test system. The description is simplified by assuming that the controlled drive 1 includes the d-c motor 14, a regulated voltage source 32, for example a thyristor converter, an exciter 49 with a control unit 50 of the motor 14, an angular speed control system with a current regulator 36 and a speed governor 35, a current generator 33, a speed transducer 34, and an integrator 37. The system is controlled by a programming device 38, one output of which is connected to the input of the integrator 37. The flexible member 2 comprises the helicopter transmission under test with a long shaft mounting the moment transducer 3, said member coupling mechanically the shafts of the synchronous generator 4 and a synchronous generator 39. Besides, the stators of the generator 4 and the motor 39 are coupled electrically. The loading moment control system contains such series-connected components as a loading moment regulator 40, a current regulator 41 of the synchronous machines 4 and 39, an exciting current regulator 42 of the synchronous machines whose field windings 43 and 44 are series-connected and coupled to the output of an exciter 45, as well as an exciting current generator 46, a current generator 47 of the machine stators, and the moment transducer 3. The output of the exciting current regulator 42 is connected to the input of the regulated exciter 45, while the input of the loading moment regulator 40 is coupled to the second output of the programming device 38 through an integrator 48. The correcting assembly 5 employs such series-connected components as the bandpass filter 9, differentiating unit 6, net time lag tuning unit 7, and the amplitude tuning unit 8. The input of the bandpass filter 9 is connected to the output of the moment transducer 3, while the output of the amplitude tuning unit 8 is connected to the inputs of the current regulator 36 of the motor 14 and the exciting current regulator 42 of the machines 4 and 39. The field winding of the motor 14 is connected to the exciter 49.

The system is controlled in two stages: at the first stage the motor 14 picks up the preset speed in the absence of a loading moment and at the second stage the helicopter transmission is loaded with the aid of the generator 4 and the motor 39. At both stages the systems controlling the speed of the motor 14 and the loading moment produced by the synchronous machines 4 and 39 are operative.

As the transmission is accelerated, the integrator 37 accepts at its input the signal from the programming device 38 corresponding to the preset speed, the signal across the input of the integrator 48 being zero. After the transmission attains the preset speed, the programming device 38 furnishes a signal enabling control of the loading moment. As a results, the field windings 43 and 44 of the synchronous machines pass exciting current and the transmission is loaded with torque.

To produce great loading moments prior to the system operation, the synchronous generator 4 and the synchronous motor 39 should be brought out of phase so that the angle equals approximately 90 electrical degrees. This is done by breaking the stator circuit of the mechanically interconnected synchronous machines. Next, the angle $\theta$ is determined by connecting a double-trace oscilloscope simultaneously to the stator windings of both machines with their rotors rotating at constant frequency while the exciting current is applied to the machines. Then, the machines are stopped and their rotors are displaced with respect to each other by a required angle whereupon the rotors are locked in position. The angle $\theta$ is checked again. If necessary, the synchronous machines should be brought out of phase and the operation is continued in accordance with the above procedure.

As mechanical oscillations occur in the system, for example, when the loading moment varies rapidly, a signal indicative of elasticity moment fluctuations is passed from the moment transducer 3 to the input of the corrective assembly 5. The signal generated in the corrective assembly 5 is applied simultaneously to the input of the current regulator 36 of the motor 14 and to the input of the exciting current regulator 42 of the synchronous machines. Besides, the corrective assembly 5 may furnish a signal to the input of the control unit 50. In the case of nonharmonic oscillations the corrective assembly 5 may additionally comprise a fundamental-frequency sine-wave generation unit or be constructed as a multichannel assembly. In the case of nonlinear systems the corrective assembly 5 may additionally include a frequency control unit and a phase-sensitive rectifier.

The preferred embodiment of the helicopter transmission test system is effective and may be rated for high power and rotational speed. The system may not, however, ensure stable operation of synchronous machines at low loads unless it incorporates the corrective assembly 5.

The use of the corrective assembly 5 provides for damping of oscillations within the system and makes it fit for testing transmissions having long shafts with abruptly varying angular speed and loading moment.

FIG. 15 shows a third embodiment of the herein proposed device for damping oscillations as applicable to a system controlling reversive mill rolls.

Referring to the drawing the controlled drive 1 comprises a d-c motor 51, a regulated voltage source 52, for example a thyristor converter, a regulated exciter 53, for example a thyristor converter, and a system controlling the speed of the motor 51, which includes a current regulator 54 of the motor 51, a speed governor 55, an integrator 56, an exciting current regulator 57 of the motor 51, an e.m.f. regulator 58 of the motor, current generators 59 of the motor 51, an e.m.f. generator 60 of the motor 51, an exciting current generator 61, and a rotational speed transducer 62 of the motor 51.

The flexible member 2 comprises a reduction gear and a long shaft having a limited rigidity with the moment transducer 3 mounted thereon.

The actuator 4 in the system comprises mill rolls.

The description is simplified by assuming that the additional primary element 14 in the system comprises a d-c machine with an exciter 63, for example a thyristor converter, an exciting current regulator 64, a current regulator 65, a current generator 66 and an exciting current generator 67 of the primary element 14. The shaft of the motor 51 is mechanically coupled to the actuator 4 through the shaft 2. The additional primary element 14 is rigidly coupled to the rolls of the actuator 4. Besides, the armature of the electrical machine 14 is connected to the armature of the motor 51.

The elements of the system controlling the rotational speed of the motor 51 are connected in the following manner. The input of the integrator 56 is connected to one of the outputs of a controller 68. The input of the speed governor 55 of the motor 51 is connected to the outputs of the integrator 56 and the speed transducer 62 of the motor 51. The input of the current regulator 54 of the motor 51 is connected to the output of the speed governor 55 and to the output of the current generator 59 of the motor 51. The output of the current regulator 54 is connected to the input of the thyristor converter 58, the armature of the motor 51 being connected to the output of said converter.

Connected to the input of the e.m.f. regulator 58 of the motor 51 are the output of the e.m.f. generator 60 of the motor 51 and the second output of the controller 68. Connected to the input of the exciting current regulator 57 is the output of the e.m.f. regulator 58 of the motor 51 and the output of the exciting current generator 61 of the motor 51. The input of the exciter 53 is connected to the output of the exciting current regulator 57 of the motor 51. A field winding 69 of the motor 51 is connected to the output of the exciter 53. The input of the current regulator 65 of the primary element 14 is connected to the third output of the controller 68 and to the output of the current generator 66, while the input of the exciting current regulator 64 of the primary element 14 is connected to the output of the current regulator 65 of the primary element 14 and to the output of the exciting current generator 67. The output of the exciting current regulator 64 is connected to the input of the exciter 63. The output of the moment transducer 3 is connected to the signal frequency separation unit 12. The description is simplified by assuming that the spectrum of mechanical oscillations contains two fundamental frequencies. The corrective assembly 5 will then include two channels, each channel incorporating such series-connected components as the differentiating unit 6, net time lag tuning unit 7, and the amplitude tuning unit 8. The outputs of the amplitude tuning units 8 of both channels are connected to the input of the signal adder unit 13, while the output of the unit 13 is simultaneously connected to the input of the exciting current regulator 57 of the motor 51, to the input of the current regulator 54 of the motor 51 and to the input of the exciting current regulator 64 of the primary element 14.

In the aforesaid system controlling the speed of the motor 51 the speed is increased in two stages: first by changing the voltage of the converter 52 applied to the motor armature with the exciting current being constant and set to the rated value and then by decreasing the exciting current of the motor 51 with the voltage across its armature being constant after the voltage applied to the armature of the motor 51 reaches the rated value.

The controller 68 first furnishes a signal setting the required e.m.f. of the motor 51 to the input of the e.m.f. regulator 58 of the motor 51.

The signal successively passes through the e.m.f. regulator 58 and the exciting current regulator 57 of the motor 51 with the result that voltage appears at the input of the exciter 53 and the current flowing through the circuit of the field winding 69 increases. The e.m.f. and exciting current of the motor 51 are stabilized by applying negative feedback from the e.m.f. generator 60 and the exciting current generator 61 of the motor 51 to the input of the respective regulators 58 and 57.

After the exciting current of the motor 51 is set to the rated value, the controller 68 furnishes a speed setting signal to the input of the integrator 56. The integrator 56 converts an intermittent input signal into an output signal linearly changing with time. This signal is applied to the speed governor 55 of the motor 51 in the external control circuit, the internal motor current control circuit with the current regulator 54 of the motor 51 being controlled by the speed governor 55 of the motor 51, while the current regulator 54 directly controls the converter 52. When the voltage of the converter 52 is close to the rated value and the signal setting the speed of the motor 52 exceeds its actual value, the exciting current control circuit of the motor 51 will be operative. The system controlling the speed of the motor 51 balances the preset and actual values of the speed of the motor 51. The e.m.f. of the motor 51 will then slightly increase. The system controlling the e.m.f. of the motor 51 sets the e.m.f. of the motor 51 to the preset value. In consequence, the motor exciting current will be reduced causing an increase in the speed of the motor 51.

A balanced condition is attained when the preset and actual values of the speed of the motor 51 are equal. The system controlling the speed of the motor 51 will then maintain this condition. In braking, the process will be reversed, i.e., the exciting current of the motor 51 will increase to the rated value after which the voltage of the converter 52 decreases. The speed of operation of the drive is to be decreased due to the presence of clearances in the reduction gear and elasticity of the coupling shaft 2. This is accounted for by the fact that mechanical oscillations resulting in premature failure of parts of the unit occur in the system when the speed and load are changed abruptly. The spectrum of mechanical oscillations generally contains several frequencies. The description is simplified by assuming that the spectrum of mechanical oscillations within the system contains two fundamental frequencies. So, a corrective signal will have to be tuned to each of the two frequencies.

When the device for damping oscillations is connected to the given system, the signal taken from the moment transducer 3 and corresponding to variations of the elasticity moment transmitted through the shaft 2 is fed to the input of the signal frequency separation unit 12 developing at its two outputs signals that correspond to the two fundamental frequencies and are applied to two channels, each of which contains the differentiating unit 6, net time lag tuning unit 7, and the amplitude tuning unit 8. The order of the elasticity moment derivative, phase and amplitude of the corrective signal are chisen to be optimum for each fundamental frequency as regards the damping of oscillations. The output signals of the amplitude tuning units 8 of both channels are applied to the input of the signal adder unit 13. The effectiveness of the device for damping oscillations is ensured by applying the signals taken from the output of the signal adder unit 13 to the inputs of the exciting current regulator 57 of the motor 51, current regulator 54 of the motor 51 and the current regulator 65 of the additional primary element 14.

As mechanical oscillations occur in the system, the corrective assembly 5 furnishes a signal being in phase opposition with respect to the a-c component of the elasticity moment transmitted through the shaft 2.

Depending on the frequency-response characteristics of the drive 1 and the additional primary element 14, the corrective signal may be applied without the use of the signal adder unit 13. If so, the signal of one channel is fed solely to the input of the current regulator 54 of the motor 51, while the signal of the other channel is fed to the input of the current regulator 65 of the primary element 14.

If signals at several fundamental frequencies are to be separated, the number of channels may be increased accordingly.

In the case of simple nonharmonic oscillations with one fundamental frequency the corrective assembly 5 may include only one channel.

With a harmonic signal picked off from the moment transducer 3, the device for damping oscillations in the system may comprise the corrective assembly 5 made up of such series-connected components as the differentiating unit 6, net time lag tuning unit 7, and the amplitude tuning unit 8.

In the case of nonlinear electromechanical systems controlling continuous mill rolls the corrective assembly 5 may additionally include the corrective signal frequency control unit 10 and the phase-sensitive rectifier 11.

Referring to the waveforms shown in FIG. 16 it is seen that considerable fluctuations in speed of rolls (a), speed (b) and current (c) of the motor and elasticity moment (d) (curves I) occur in the system controlling the mill rolls 4 with loading moment being varied in steps. The fluctuations are fully eliminated (curves II) in the system incorporating the corrective assembly 5 connected to the moment transducer 3 and coupled, at the same time, to the inputs of the current regulator 54 of the motor 51 and the exciting current regulator 57 of the motor 51.

The use of the hereinproposed device for damping oscillations in a system controlling mill rolls reduces dynamic loads, which appreciably decreases the total number of failures of mechanical parts and electrical machine parts and permits a further increase in the working roll speeds.

FIG. 17 shows a fourth embodiment of the hereinproposed device for damping oscillations as applicable to an extensive multimember helicopter transmission test system.

Referring to the drawing the multiconnection helicopter transmission 2 under test with flexible members comprises a first input shaft 69 with a free-wheeling clutch 70 and and the moment transducer 3, a second input shaft 71 with a free-wheeling clutch 72 and the moment transducer 3, a shaft 73 with steering rotor reduction gears and the moment transducer 3, a main rotor shaft 74 with the moment transducer, and a main reduction gear 75. The controlled drive of the first input shaft 69 includes a first induction motor 76, a d-c/a-c converter 77 producing regulated frequency current, a controlled rectifier 78, a transformer 79, a speed governor 80, a current regulator 81, and speed transducers 82 of the controlled rectifier 78. The controlled drive of the second input shaft 71 includes a second induction motor 84, a second d-c/a-c converter 85 producing regulated frequency current, a second controlled rectifier 86, a speed governor 87, a current regulator 88, a speed transducer 89 of the second motor 84, a current generator 90 of the second controlled rectifier 86, a load balancer 91 of the converters 77 and 85, and a transformer 92.

The actuator comprises a first synchrinous generator 93 with an exciter 94, a third rectifier 95, an inverter 96, a transformer 97, a moment regulator 98 and an exciting current regulator 99 of the generator 92, the moment transducer 3, an exciting current generator 100 of the generator 92, a second synchronous generator 101 with an exciter 102, a moment regulator 103, an exciting current regulator 104 of the second generator 101, the moment transducer 3, an exciting current generator 105, transformers 106, 107, a fourth rectifier 108 and a fifth rectifier 109.

The control unit of the system for testing the helicopter transmission 2 is composed of a programming device 110 with output integrators 111, 112, 113, 114, and 115.

The system controlling the loading moment of the generator 93 may include a device 116 for setting the e.m.f. and limiting the current of the inverter 96.

The device for damping oscillations in the given system contains four circuits incorporating the corrective assemblies 5.

The first input shaft 69 and the second input shaft 71, as well as the steering rotor shaft 73 and the main rotor shaft 74, are mechanically interconnected through the main reduction gear 75, each of said shafts mounting its moment transducers 3. The motor 76 mechanically coupled to the shaft 69 is connected to the output of the converter 77 which is connected to a supply mains 117 through the controlled rectifier 78 and the transformer 79. The input of the speed governor 80 is connected to the speed transducer 82 and the integrator 111, while the input of the current regulator 81 is connected to the outputs of the speed governor 80 of the motor 76 and the current generator 83, the output of said current regulator being connected to the controlled rectifier 78. The second motor 84 mechanically coupled to the shaft 71 is connected to the output of the converter 85 which is connected to the supply mains 117 through the second controlled rectifier 86 and the transformer 92.

The input of the speed governor 87 is connected to the outputs of the integrator 112 and the speed transducer 89 of the motor 84, while the input of the current regulator 88 is connected to the outputs of the speed governor 87 and the current generator 90 and the output thereof to the input of the controlled rectifier 86. The load balancer 91 is connected to the elements of the converters 77 and 85.

The stator winding of the synchronous generator 93 mechanically coupled to the shaft 73 is connected to the supply mains 117 through the rectifier 95, inverter 96, and the transformer 97. The input of the loading moment regulator 98 of the generator 93 is connected to the outputs of the integrator 113 and the moment transducer 3, while the input of the exciting current regulator 99 is connected to the outputs of the loading moment regulator 98 and the exciting current generator 100 of the generator 93.

The stator winding of the second synchronous generator 101 mechanically coupled to the shaft 74 is connected to the outputs of the controlled rectifiers 78 and 86 via two circuits, each made up of a transformer (106 or 107) and a rectifier (108 or 109).

The input of the loading moment regulator 103 of the generator 101 is connected to the outputs of the integrator 114 and the moment transducer 3, the input of the exciting current regulator 104 being connected to the outputs of the loading moment regulator 103 and the exciting current generator 105. The output of the device 116 for setting the e.m.f. and limiting the current is connected to the inverter 96, whereas its input is connected to the output of the integrator 115.

The input of the first corrective assembly 5 is connected to the moment transducer 3 mounted on the shaft 69 and the output thereof is connected to the input of the current regulator 81 of the rectifier 78. The input of the second corrective assembly 5 is connected to the moment transducer 3 mounted on the shaft 71 and the output thereof is connected to the current regulator 88 of the rectifier 86. The input of the third corrective assembly 5 is connected to the moment transducer 3 mounted on the transmission shaft 73 and the output thereof is connected to the exciting current regulator 99 of the generator 93. Similarly, the input of the fourth corrective assembly 5 is connected to the moment transducer 3 mounted on the shaft 74 and the output thereof is connected to the exciting current regulator 104 of the generator 101.

The helicopter transmission test system operates in the following manner. The signals taken from the programming device 110 are applied through the integrators 111 and 112 to the governors 80 and 87 of the system controlling the speed of the motors 76 and 84. As a result, the voltage with gradually increasing amplitude and frequency appears at the outputs of the converters 77 and 85 due to which the motors 76 and 84 pick up the preset speed. Then, the programming device 110 feeds signals through the integrator 113 to the system controlling the loading moment produced by the generator 93 on the shaft 73, through the integrator 114 to the system controlling the loading moment produced by the generator 101 on the shaft 74, and through the integrator 115 to the device 116 for setting the e.m.f. and limiting the current of the inverter 96. Thereupon the signals taken from the programming device 110 are applied to the system in accordance with the chosen program for testing the transmission. During transmission tests, the power furnished by the generator 93 is returned to the supply mains 117 through the rectifier 95, inverter 96 and the transformer 97, while the power furnished by the generator 101 is returned through the converters 77 and 85 to the shafts of the motors 76 and 84 by way of the transformers 108, 109 and the rectifiers 106, 107.

As mechanical oscillations occur on any one of the transmission shafts, the signal taken from the moment transducer 3 is applied through the corrective assembly 5 to the input of the regulator in the respective control system, thereby damping the oscillations.

In the event of simple nonharmonic oscillations with one fundamental frequency the corrective assembly 5 may contain only one channel. With several fundamental frequencies in the spectrum of mechanical oscillations, the number of channels in the corrective assemblies 5 may be increased accordingly.

In the case of nonlinear electromechanical control systems the corrective assembly 5 may additionally include the corrective signal frequency control unit 10 and the phase-sensitive rectifier 11.

The hereinproposed device for damping oscillations in extensive multimember helicopter transmission test systems makes it possible to develop mechanical systems for testing helicopter transmissions, which have the following advantages over the prior art overall testing systems: a lower fuel consumption; noiseless operation; a lesser amount of exhaust gases; the possibility of obtaining repeated test data regardless of weather conditions; and also the possibility of producing ultimate loads that may be as high as to break the transmission elements.

It should be noted in conclusion that the basic dynamic loads in rolling mills, paper-making machines, metal-cutting machines, coal combines, forge-and-press machines and like equipment are of oscillatory nature. So, the use of the hereinproposed device for damping mechanical oscillations in the drives of such units substantially reduces the dynamic loads and increases the speed of operation and accuracy of systems controlling various current electromechanical parameters, which ultimately enhances the efficiency and improves the production quality.

The invention is not limited to the four specific embodiments disclosed in the accompanying drawings and specification, inasmuch as it can be used in various engineering fields for damping oscillations occurring in actual systems.

What is claimed is:

1. A device for damping mechanical oscillations in a system comprising a controlled drive; a flexible member with a moment or force transducer, mechanically coupled to said drive; an actuator also coupled mechanically to said flexible member; a corrective assembly designed to shape a signal being in phase opposition with respect to the a-c component of oscillations within said system; included in said system for damping occurring oscillations and having a differentiating unit whose input is connected to said moment or force transducer, a net time lag time unit whose input is connected to the output of said differentiating unit, and an amplitude tuning unit, the input of which is connected to the output of said net time lag tuning unit and whose output is connected to the input of said drive.

2. A device as claimed in claim 1, wherein said corrective assembly includes a differentiating unit incorporating a first potentiometer having two leads and a moving contact, one lead of said first potentiometer being connected to a common circuit conductor, while the other lead accepts a signal from said moment or force transducer; a first capacitor, one lead of which is connected to the moving contact of said first potentiometer; second resistor connected to the other lead of said first capacitor; a third resistor whose one lead is connected to said common circuit conductor; a first operational amplifier having inverting and non-inverting inputs, an output and a common lead, said inverting input being connected to the other lead of said second resistor, while said non-inverting input is connected to the other lead of said third resistor; a fourth resistor, one lead of which is connected to the inverting input of said first amplifier and whose other lead is connected to the output of said first amplifier; a second capacitor, one lead of which is connected to one of the leads of said fourth resistor and whose other lead is connected to the second lead of said fourst resistor; said first operational amplifier and the aforementioned components electrically coupled thereto which discriminate the 1st order derivative of an input signal of said moment or force transducer; a fifth resistor whose one lead is connected to the output of said first amplifier; a sixth resistor whose one lead is connected to the common lead of said first amplifier and also to said common circuit conductor; a second operational amplifier having inverting and noninverting inputs, an output and a common lead, said inverting input being connected to the other lead of said fifth resistor, while said non-inverting input is connected to the other lead of said sixth resistor and the common lead of said second amplifier is connected to said common circuit conductor; a seventh resistor, one lead of which is connected to the inverting input of said second amplifier and whose other lead is connected -o the output of said second amplifier; an eighth resistor whose lead is connected to the other lead of said seventh resistor and also to the output of said second amplifier; a third operational amplifier having inverting and non-inverting inputs, an output and a common lead, said inverting input being connected to the other lead of said eight resistor; a ninth resistor, one lead of which is connected to the inverting input of said third amplifier and whose other lead is connected to the output of said third amplifier; a tenth resistor, one lead of which is connected to the noninverting input of said third amplifier and whose other lead is connected to the common lead of said third amplifier and to said common circuit conductor; an eleventh resistor whose one lead is connected to the output of said third amplifier; a fourth amplifier having inverting and non-inverting inputs, an output and a common lead, said inverting input being connected to the other lead of said eleventh resistor, while said non-inverting input is connected to the other lead of said tenth resistor; a third capacitor, one lead of which is connected to the inverting input of said fourth amplifier and whose other lead is connected to the output of said fourth amplifier, the common lead of which is connected to said common circuit conductor; a twelfth resistor, one laead of which is connected to one of the leads of said third capacitor and to the output of said fourth amplifier and whose other lead is connected to the inverting input of said second amplifier; said second, third and fourth amplifiers and the aforementioned components electrically coupled thereto and connected past the first operational amplifier, which discriminates the 2nd order derivative of an input signal of said moment or force transducer; a net time lag tuning unit incorporating a fifth operational amplifier which has inverting and non-inverting inputs, an output and a common lead, said non-inverting input and said common lead of said amplifier being connected to said common circuit conductor; a first electrical button having two pairs of normally closed contacts and two pairs of normally open contacts, said button being connected to the output of said third amplifier via one lead of said first pair of its normally closed contacts; a second electrical button having two pairs of normally closed contacts and two pairs of normally open contacts, said button being connected to the other lead of the first pair of the normally closed contacts of said first button via one lead of said first pair of the normally closed contacts of said second button; a third electrical button having two pairs of normally closed contacts and two pairs of normally open contacts, said button being connected to the other lead of said first pair of the normally closed contacts of said second electrical button via one lead of said first pair of the normally closed contacts of said third button; a fourth electrical button having two pairs of normallu closed contacts and two pairs of normally open contacts and connected via one lead of said first pair of its normally closed contacts to the other lead of said first pair of the normally closed contacts of said third electrical button; a fifth electrical button having two pairs of normally open contacts and connected via one lead of the first pair of its normally open contacts to the other lead of the first pair of the normally closed contacts of said fourth electrical button; a fourth capacitor, one lead of which is connected to the other lead of the first pair of the normally open contacts of said fifth button and whose other lead is electrically connected to the inverting input of said fifth amplifier; a sixth electrical button having two pairs of normally open contacts and connected via one lead of the first pair of its normally open contacts to the first lead of the first pair of the normally open contacts of said fifth button and to the other lead of the first pair of the normally closed contacts of said fourth button; a seventh electrical button having two pairs of normally open contacts and connected via one lead of said first pair of its normally open contacts to the other lead of said first pair of the normally closed contacts of said fourth button; a fifth capacitor, one lead of which is connected to the inverting input of said fifth amplifier and whose other lead is connected to the second lead of the first pair of the normally open contacts of said sixth button; a sixth capacitor, one lead of which is connected to the inverting input of said fifth amplifier and whose other lead is connected to the second lead of the first pair of the normally open contacts of said seventh button; a seventh capacitor, one lead of which is connected to the lead of the second pair of the normally closed contacts of said fourth button and whose other lead is connected to the second lead of the first pair of the normally closed contacts of said fourth button through the second pair of the normally open contacts of said fifth button; an eighth capacitor, one lead of which is connected to the lead of said seventh capacitor and whose other lead is connected to the other lead of the first pair of the normally closed contacts of said fourth button through the second pair of the normally open contacts of said sixth button; a ninth capacitor, one lead of which is connected to the lead of said eighth capacitor and to the output of said fifth amplifier and whose other lead is connected to the second lead of the first pair of the normally closed contacts of said fourth button through the second pair of the normally open contacts of said seventh button; a fourteenth resistor, one lead of which is connected to the output of said third amplifier and whose other lead is connected to the lead of the pair of the normally open contacts of said first button; a fifteenth resistor, one lead of which is connected to the second lead of the first pair of the normally open contacts of said first button and whose other lead is connected to the lead of the first pair of the normally open contacts of said second button; a sixteenth resistor, one lead of which is connected to the second lead of the first pair of the normally open contacts of said second button and whose other lead is connected to the lead of the first pair of the normally cpen contacts of said third button; a seventeenth resistor, one lead of which is connected to the second lead of the first pair of the normally open contacts of said third button and whose other lead is connected to the lead of the first pair of the normally open contacts of said fourth button; the second lead of the first pair of the normally open contacts of said fourth button, which is connected to the other lead of the first pair of the normally closed contacts of said fourth button; an eighteenth resistor, one lead of which is connected to the lead of said fourth capacitor and to the inverting input of said fifth amplifier and whose other lead is connected to the second pair of the normally open contacts of said first button; a nineteenth resistor, one lead of which is connected to the other lead of the second pair of the normally open contacts of said first button and whose other lead is connected to the lead of the second pair of the normally open contacts of said second button; a twentieth resistor, one lead of which is connected to the other lead of the second pair of the normally open contacts of said second button and whose other lead is connected to the lead of the second pair of the normally open contacts of said second button and whose lead is connected to the lead of the second pair of the normally open contacts of said third button; a twenty-first resistor, one lead of which is connected to the other lead of the second pair of the normally open contacts of said third button and whose other lead is connected to the lead of the second pair of the normally open contacts of said fourth button; a second pair of the normally closed contacts of said first button, one lead of which is connected to the leads of said fourth, fifth, and sixth capacitors, to said eighteenth resistor and to the inverting input of said fifth amplifier and whose other lead is connected to the lead of the second pair of the normally closed contacts of said second button, a second pair of the normally closed contacts of said second button, connected via the other lead thereof to the lead of the second pair of the normally closed contacts of said third button; a second pair of the normally closed contacts of said third button, connected via the other lead thereof to the lead of the second pair of the normally closed contacts of said fourth button; a second pair of the normally closed contacts of said fourth button, connected via the other leads thereof to the second pair of the normally open contacts of said fourth button; a twenty-third resistor, one lead of which is connected to the lead of said fourteenth resistor and the ninth resistor; a twenty-second resistor whose lead is connected to the leads of said seventh, eighth and ninth capacitors, a sixth operational amplifier having inverting and non-inverting inputs, an output and a common lead, said inverting input being connected to the other lead of said twenty-second resistor and to the other lead of said twenty-third resistor; a twenty-fourth resistor, one lead of which is connected to the inverting input of said sixth amplifier and whose other lead is connected to the output of said sixth amplifier; a twenty-fifth resistor, one lead of which is connected to the non-inverting input of said sixth amplifier and whose other lead is connected to said common circuit conductor and to the common lead of said sixth amplifier; said fifth and sixth operational amplifiers and components electrically coupled thereto controlling the net time lag of the output signal with respect to the input signal; an output signal amplitude tuning unit incorporating a twenty-sixth potentiometer whose leads are connected respectively to the output and common conductor of the circuit and to the common lead of said sixth amplifier, the output signal being derived from the moving contact of said potentiometer and the common circuit conductor.

3. A device as claimed in claim 1, wherein said corrective assembly additionally includes a fundamental-frequency sine-wave signal generation unit designed to separate, in the presence of nonharmonic mechanical oscillations within said system, a signal corresponding to the fundamental frequency and connected via the input thereof to the output of said moment transducer and via the output thereof to the input of said differentiating unit.

4. A device as claimed in claim 3, wherein said corrective assembly comprises the fundamental-frequency sine-wave signal generation unit including a first resistor whose one lead is connected to one of the leads of said moment transducer; a second resistor whose one lead is connected to the second lead of said first resistor; a first operational amplifier having inverting and non-inverting inputs and one output, said non-inverting input being connected to the second lead of said second resistor; a first capacitor, one lead of which is connected to the leads of said first and second resistors; a second capacitor, one lead of which is connected to the non-inverting input of said first amplifier and whose other lead is connected to the second output of said moment transducer and to one of the inputs of said differentiating unit; a third resistor, one lead of which is connected to the input of said first amplifier, to the second lead of said first capacitor and to the second input of said differentiating unit; a fourth resistor, one lead of which is connected to the first input of the differentiating unit, to one lead of said capacitor and to one output of the moment transducer and whose other lead is connected to the second lead of said third resistor and to the inverting input of said first amplifier.

5. A device as claimed in claim 3, wherein said corrective assembly comprises a corrective signal frequency control unit matching in nonlinear systems the frequency of a corrective signal with that of a desired signal for said system and connected via the input thereof to the output of said amplitude tuning unit and via the output thereof to the input of said drive.

6. A device as claimed in claim 5, wherein said corrective assembly comprises a phase-sensitive rectifier enabling discrimination of a voltage half-wave of desired polarity from the a-c component of the corrective signal and connected via the input thereof to the output of said corrective signal frequency control unit and via the output thereof to the input of said drive.

7. A device as claimed in claim 6, which is used in a system controlling a continuous mill roll processing material in to an elastic metal strip, comprising several said actuators formed with successively arranged roll stands mechanically interconnected through the material being processed; controlled power drives whose number corresponds to the number of said actuators; flexible members in the form of shafts whose number corresponds to the number of said actuators; moment transducers mounted on each said flexible member; corrective assemblies whose number corresponds to the number of said moment transducers; said first drive being mechanically coupled to said first actuator through said first flexible member with the first moment transducer arranged thereon, the output of said first moment transducer being connected to the input of said first corrective assembly whose output is connected to the input of said first drive; said second drive being mechanically coupled to said second actuator through said second flexible member with the second moment transducer arranged thereon, the output of said second moment transducer being connected to the input of said second corrective assembly whose output is connected to the input of said second drive; said third driving being mechanically coupled to said third actuator through said third flexible member with the third moment transducer arranged thereon, the output of said third moment transducer being connected to the input of said third corrective assembly whose output is connected to the input of said third drive.

8. A device as claimed in claim 1, which additionally includes a signal frequency separation unit serving to discriminate fundamental harmonic components from the signal of said moment transducer and having an input and an output, said input being connected to said moment transducer; several said corrective assemblies whose number corresponds to the number of the discriminated harmonic components, each corrective assembly forming a channel and the input of each channel being connected to the output of said signal frequency separation unit.

9. A device as claimed in claim 8, wherein the signal frequency separation unit comprises one bandpass filter incorporating a first resistor whose first lead is connected to one of the outputs of said moment transducer; a second resistor, one lead of which is connected to the second lead of said first resistor and whose other lead is connected to the second lead of said first resistor; a first capacitor, one lead of which is connected to the second lead of said first resistor; a second capacitor, one lead of which is connected to the first lead of said first capacitor; and first operational amplifier having inverting and non-inverting inputs and an output; a third resistor, one lead of which is connected to the second lead of said first capacitor and to the inverting input of said first amplifier and whose other lead is connected to the second lead of said second capacitor, to the output of said first amplifier and tp one of the inputs of said corrective assembly; a fourth resistor, one lead of which is connected to the non-inverting input of said first amplifier and whose other lead is connected to the second lead of said second resistor, to the second output of said moment transducer and to the second input of said corrective assembly.

10. A device as claimed in claim 8, which additionally includes a unit adding up signals of all channels and connected via the input thereof to the outputs of all said channels and via the output thereof to the input of said drive.

11. A device as claimed in claim 10, wherein said unit adding up signals of all said channels includes a first resistor, one lead of which is connected to one output of said first channel; a second resistor whose one lead is connected to one output of said second channel; a third resistor whose one lead is connected to one putput of said third chanel; a first operational amplifier having inverting and noninverting inputs and two outputs; a fourth resistor, one lead of which is connected to the second lead of said first resistor, to the second lead of said second resistor, to the second lead of that third and to the inverting input of said first amplifier and whose other lead is connected to one output of said first amplifier; a fifth resistor, one lead of which is connected to the inverting input of said first amplifier and whose other lead is connected to the second output of said first amplifier, to the second output of said first channel, to the second output of said second channel and to the second output of said third channel.

12. A device as claimed in claim 10, which additionally includes a primary element designed to damp mechanical oscillations within said system with a corrective signal fed to the input of said primary element in the case of a great response lag of said drive, said primary element being mecanically coupled to said actuator and electrically connected to the output of the unit adding up signals of all channels.

13. A device as claimed in claim 12, wherein said primary element comprises a d-c machine with a regulated d-c voltage source, having an output and an input, said input being connected to the output of said unit adding up signals of all channels, while said output is connected to the armature of said electrical machine.

14. A device as claimed in claim 13, wherein the input of said regulated d-c voltage source is connected to the output of one of said channels.

* * * * *